(12) United States Patent
Batts et al.

(10) Patent No.: US 12,179,794 B2
(45) Date of Patent: *Dec. 31, 2024

(54) SYSTEMS AND METHODS FOR IMPLEMENTING AN AUTONOMOUS VEHICLE RESPONSE TO SENSOR FAILURE

(71) Applicant: Motional AD LLC, Boston, MA (US)

(72) Inventors: Zachary Thomas Batts, Pittsburgh, PA (US); Ludong Sun, Pittsburgh, PA (US); Ky Woodard, Pittsburgh, PA (US); Qian Wang, Allison Park, PA (US); Yiming Zhao, Allison Park, PA (US); Stephanie Lee, Pittsburgh, PA (US); Lin Zhao, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,960

(22) Filed: Jan. 4, 2023

(65) Prior Publication Data

US 2023/0146312 A1 May 11, 2023

Related U.S. Application Data

(62) Division of application No. 16/862,431, filed on Apr. 29, 2020, now Pat. No. 11,548,526.
(Continued)

(51) Int. Cl.
*B60W 60/00* (2020.01)
*B60Q 1/46* (2006.01)
(Continued)

(52) U.S. Cl.
CPC ............ *B60W 60/001* (2020.02); *B60Q 1/46* (2013.01); *B60Q 5/005* (2013.01);
(Continued)

(58) Field of Classification Search
CPC .......... B60W 60/001; B60W 50/0205; B60W 50/023; B60W 2552/00; B60W 2050/0215; B60Q 1/46; B60Q 5/005; G05D 1/0214
See application file for complete search history.

(56) References Cited

U.S. PATENT DOCUMENTS 9,201,421 B1   12/2015   Fairfield et al.
9,465,388 B1   10/2016   Fairfield
(Continued)

FOREIGN PATENT DOCUMENTS

CN   104925053   9/2015
CN   107628036   1/2018
(Continued)

OTHER PUBLICATIONS

[No Author Listed], "SAE International: Surface Vehicle Recommended Practice," J3016 SAE International, Sep. 30, 2016, 30 pages.

*Primary Examiner* — Hussein Elchanti
(74) *Attorney, Agent, or Firm* — Fish & Richardson P.C.

(57) ABSTRACT

Among other things, we describe techniques for implementing a vehicle response to sensor failure. In general, one innovative aspect of the subject matter described in this specification can be embodied in methods that include receiving information from a plurality of sensors coupled to a vehicle, determining that a level of confidence of the received information from at least one sensor of a first subset of sensors of the plurality of sensors is less than a first threshold, comparing a number of sensors in the first subset of sensors to a second threshold, and adjusting the driving capability of the vehicle to rely on information received from a second subset of sensors of the plurality of sensors,
(Continued)

wherein the second subset of sensors excludes the at least one sensor of the first subset of sensors.

18 Claims, 15 Drawing Sheets

Related U.S. Application Data

(60) Provisional application No. 62/839,886, filed on Apr. 29, 2019.

(51) Int. Cl.
    *B60Q 5/00*        (2006.01)
    *B60W 50/02*     (2012.01)
    *B60W 50/023*   (2012.01)
    *G05D 1/00*      (2006.01)

(52) U.S. Cl.
    CPC ...... *B60W 50/0205* (2013.01); *B60W 50/023* (2013.01); *G05D 1/0214* (2013.01); *B60W 2050/0215* (2013.01); *B60W 2552/00* (2020.02)

(56) References Cited

U.S. PATENT DOCUMENTS

| | | | | |
|---|---|---|---|---|
| 11,548,526 | B2* | 1/2023 | Batts | B60W 60/001 |
| 2002/0087253 | A1* | 7/2002 | Jeon | G06T 7/70 |
| | | | | 180/170 |
| 2005/0062615 | A1* | 3/2005 | Braeuchle | G01S 13/867 |
| | | | | 340/903 |
| 2008/0023927 | A1* | 1/2008 | Kim | B60G 17/0155 |
| | | | | 280/5.514 |
| 2010/0250051 | A1* | 9/2010 | Nestico | G05B 17/02 |
| | | | | 701/100 |
| 2014/0379254 | A1* | 12/2014 | Miksa | G01C 21/30 |
| | | | | 701/450 |
| 2015/0051778 | A1* | 2/2015 | Mueller | B60W 10/06 |
| | | | | 701/29.2 |
| 2015/0291177 | A1* | 10/2015 | Lee | B60W 40/06 |
| | | | | 73/146 |
| 2016/0253566 | A1* | 9/2016 | Stein | G06V 20/56 |
| | | | | 348/148 |
| 2016/0356594 | A1* | 12/2016 | Sorenson | G08G 1/161 |
| 2017/0088134 | A1* | 3/2017 | Liu | G08G 1/165 |
| 2017/0123428 | A1 | 5/2017 | Levinson et al. | |
| 2017/0219338 | A1* | 8/2017 | Brown | G01S 17/87 |
| 2017/0248951 | A1 | 8/2017 | Miller | |
| 2018/0015801 | A1* | 1/2018 | Mohamed | H04L 67/12 |
| 2018/0040171 | A1 | 2/2018 | Kundu et al. | |
| 2018/0283861 | A1* | 10/2018 | Kourogi | G01C 5/06 |
| 2018/0297609 | A1 | 10/2018 | Bozsik | |
| 2019/0061775 | A1 | 2/2019 | Emura et al. | |
| 2019/0210612 | A1* | 7/2019 | VanLandingham | B60W 10/18 |
| 2019/0293772 | A1* | 9/2019 | Pfeiffer | G05D 1/024 |
| 2020/0339151 | A1 | 10/2020 | Batts et al. | |

FOREIGN PATENT DOCUMENTS

| | | |
|---|---|---|
| CN | 108981781 | 12/2018 |
| CN | 109204131 | 1/2019 |
| CN | 109421739 | 3/2019 |
| DE | 102014210147 | 12/2015 |
| JP | 2012108755 | 6/2012 |
| JP | 2014106854 | 6/2014 |
| JP | 2015170256 | 9/2015 |
| JP | 2017178267 | 10/2017 |
| JP | 2018012370 | 1/2018 |
| JP | 2018116612 | 7/2018 |
| KR | 1020040044034 | 5/2004 |
| KR | 1020120105862 | 9/2012 |
| KR | 1020140039243 | 4/2014 |
| KR | 101406208 | 6/2014 |
| KR | 1020140127068 | 11/2014 |
| KR | 1020180007412 | 1/2018 |
| KR | 1020180049040 | 5/2018 |
| KR | 1020190003800 | 1/2019 |
| KR | 1020190012954 | 2/2019 |
| KR | 101967339 | 4/2019 |
| WO | WO 2012166170 | 12/2012 |
| WO | WO 2019066841 | 4/2019 |
| WO | WO 2019106664 | 6/2019 |

* cited by examiner

SYSTEMS AND METHODS FOR IMPLEMENTING AN AUTONOMOUS VEHICLE RESPONSE TO SENSOR FAILURE

CROSS-REFERENCE TO RELATED APPLICATION

This application is a divisional of U.S. application Ser. No. 16/862,431, filed Apr. 29, 2020, now allowed, which claims priority to U.S. Application Ser. No. 62/839,886, filed on Apr. 29, 2019. The disclosure of the prior applications are considered part of the disclosure of this application, and both are incorporated in its entirety into this application.

FIELD OF THE INVENTION

This description relates to systems and methods for implementing an autonomous vehicle response to sensor failure.

BACKGROUND

Autonomous vehicles have benefits over human-drive vehicles, e.g., reducing road fatalities, traffic congestion, parking congestion, and fuel efficiency. In making driving decisions, typical autonomous vehicle systems take account of objects—such as other vehicles and obstacles—of the surrounding environment that the autonomous vehicle system knows are in the environment of the vehicle by utilizing sensors. These sensors may fail from time-to-time due a wide variety of factors, for example manufacturing defects, end of operational life, tampering, cascading system failure, physical damage, and the like. The loss of one or more sensors may impede the vehicle's ability to operate properly.

SUMMARY

Techniques are provided for implementing a vehicle response to sensor failure at a first device with one or more processors and memory. In general, one innovative aspect of the subject matter described in this specification can be embodied in methods that include the actions of receiving information from a plurality of sensors coupled to a vehicle, wherein a driving capability of the vehicle relies on the information from the plurality of sensors, determining, based on the received information of each sensor of the plurality of sensors, that a level of confidence of the received information from at least one sensor of a first subset of sensors of the plurality of sensors is less than a first threshold, in response to determining that the level of confidence of the received information from the at least one sensor of the first subset of sensors is less than the first threshold, comparing a number of sensors in the first subset of sensors to a second threshold, and upon determining that the number of sensors in the first subset of sensors is less than the second threshold, adjusting the driving capability of the vehicle to rely on information received from a second subset of sensors of the plurality of sensors, wherein the second subset of sensors excludes the at least one sensor of the first subset of sensors.

These and other embodiments can each optionally include one or more of the following features.

In some aspects, the level of confidence of the received information for each sensor of the first subset of sensors exceeds the first threshold.

In some aspects, each sensor of the plurality of sensors is allocated a weight indicative of a corresponding importance of each respective sensor, and wherein comparing the number of sensors in the first subset to the second threshold includes weighting each sensor in the first subset of sensors according to a respective weight, and comparing a weighted number of the sensors in the first subset of sensors to the second threshold.

In some aspects, the methods can further include adjusting the driving capability of the vehicle to execute emergency maneuvers to navigate the vehicle to a safe location upon determining that the number of sensors in the first subset of sensors is great than or equal to the second threshold. In some aspects, the second threshold corresponds to all sensors of the plurality of sensors, and wherein adjusting the driving capability of the vehicle to execute emergency maneuvers includes one or more of activating one or more lights or moving away from a traveled route by dead reckoning. In some aspects, the second threshold corresponds to all sensors of the plurality of sensors, and wherein adjusting the driving capability of the vehicle to execute emergency maneuvers includes accessing, by the first device, last known data for controlling the driving capability of the vehicle, wherein the last known data includes information received from a particular sensor before the received information of the particular sensor indicated that the level of confidence was less than the first threshold, and using the last known data, navigating the vehicle to a safe location. In some aspects, the safe location is one of a road shoulder, an emergency lane, a service station, or a home base for the vehicle.

In some aspects, the second threshold corresponds to all sensors in the plurality of sensors, and wherein adjusting the driving capability of the vehicle to execute emergency maneuvers includes querying one or more other vehicles for driving information, in response to the querying, receiving, from at least one of the one or more other vehicles, information on or more of road conditions or navigation instructions, and using the received information on or more of road conditions or navigation instructions, navigating the vehicle to a safe location. In some aspects, the safe location is one of a road shoulder, an emergency lane, a service station or a home base for the vehicle.

In some aspects, the method further includes upon determining that the number of sensors in the first subset of sensors is less than the second threshold, activating one or more backup sensors, and configuring the one or more backup sensors to perform operations previously performed by the first subset of sensors of the plurality of sensors. In some aspects, the backup sensors are different from sensors included in the plurality of sensors. In some aspects, the backup sensors include at least one sensor of the plurality of sensors.

In some aspects, the method further includes upon determining that the number of sensors in the first subset of sensors is less than the second threshold, providing a warning to other vehicles indicative of an emergency corresponding to the vehicle. In some aspects, the warning includes one or more of activating a light emitting device of the vehicle, or activating a sound emitting device of the vehicle. In some aspects, the warning includes sending a wireless signal to at least one of emergency services and a command center for teleoperation.

In some aspects, determining that the level of confidence of the received information from the at least one sensor of the first subset of sensors is less than the first threshold includes comparing measurements received from sensors in the first subset of sensors to a measurement threshold, and determining whether the measurements received from the sensors in the first subset of sensors are less than or equal to the measurement threshold.

In some aspects, comparing measurements received from sensors in the first subset of sensors to the measurement threshold includes for each respective sensor in the first subset of sensors that the level of confidence of the received information is less than the first threshold, determining a sensor type and a coverage area of the respective sensor, identifying a third subset of other sensors of at least one of the same sensor type of the respective sensor or of the same coverage area, wherein each identified sensor in the third subset of other sensors does not have a level of confidence of the received information less than the first threshold, acquiring measurements received from the third subset of other sensors, and determining whether measurements received from each sensor in the third subset of other sensors compared to measurements received from the respective sensor in the first subset of sensors are greater than or equal to a sensor agreement threshold. In some aspects, upon determining that measurements received from each sensor in the third subset of other sensors compared to measurements received from each respective sensor in the first subset of sensors are greater than or equal to the sensor agreement threshold, the method further includes determining that the measurements received from the respective sensor in the first subset of sensors are less than or equal to the measurement threshold.

In some aspects, determining that a level of confidence of the received information from at least one sensor of a first subset of sensors of the plurality of sensors is less than a first threshold includes comparing measurements received from sensors in the first subset of sensors to a range of values corresponding to a statistical confidence interval, and determining that the measurements received from the sensors in the first subset of sensors are outside the range of values corresponding to the statistical confidence interval.

In general, one innovative aspect of the subject matter described in this specification can be embodied in methods that include the actions of receiving, by a computer system of an autonomous vehicle (AV), information from a set of two or more sensors of the AV, determining, by the computer system and based on the received information, that a level of confidence of the received information from at least one sensor of a first subset of the set of two or more sensors is less than a first threshold, in response to determining that the level of confidence of the received information from the at least one sensor of the first subset of sensors is less than the first threshold, determining, by the computer system, whether to adjust a driving function of the AV based on a number of sensors in the first subset of sensors or a number of sensors in a second subset of sensors that excludes the first subset of sensors, and in accordance with the determination to adjust the driving function, causing, by the computer system, the driving function to be adjusted.

In some aspects, the level of confidence of the received information for each sensor of the first subset of sensors exceeds the first threshold.

In some aspects, each sensor is allocated a weight indicative of a corresponding importance of each respective sensor, and wherein determining whether to adjust the driving function of the AV based on the number of sensors in the first subset of sensors or the number of sensors in a second subset of sensors that excludes the first subset of sensors includes weighting each sensor in the first subset of sensors according to a respective weight, and comparing a weighted number of the sensors in the first subset of the set of two or more sensors to a second threshold.

In some aspects, causing the driving function to be adjusted includes adjusting, by the computer system, the driving capability of the vehicle to execute emergency maneuvers to navigate the vehicle to a safe location. In some aspects, adjusting the driving capability of the vehicle to execute emergency maneuvers comprises one or more of activating one or more lights or moving away from a traveled route by dead reckoning. In some aspects, adjusting the driving capability of the vehicle to execute emergency maneuvers includes accessing last known data for controlling the driving capability of the vehicle, wherein the last known data includes information received from a particular sensor before the received information of the particular sensor indicated that the level of confidence was less than the first threshold, and using the last known data, navigating the vehicle to a safe location. In some aspects, the safe location is one of a road shoulder, an emergency lane, a service station, or a home base for the vehicle.

In some aspects, adjusting the driving capability of the vehicle to execute emergency maneuvers includes querying one or more other vehicles for driving information, in response to the querying, receiving, from at least one of the one or more other vehicles, information on or more of road conditions or navigation instructions, and using the received information on or more of road conditions or navigation instructions, navigating the vehicle to a safe location. In some aspects, the safe location is one of a road shoulder, an emergency lane, a service station, or a home base for the vehicle.

In some aspects, the method further includes upon determining that the number of sensors in the first subset of the set of two or more sensors is greater than or equal to a second threshold, activating one or more backup sensors, and configuring the one or more backup sensors to perform operations previously performed by the first subset of sensors. In some aspects, the backup sensors are different from sensors included in the plurality of sensors. In some aspects, the backup sensors include at least one sensor of the plurality of sensors.

In some aspects, the method further includes upon determining that the number of sensors in the first subset of the set of two or more sensors is greater than or equal to a second threshold, providing a warning to other vehicles indicative of an emergency corresponding to the AV. In some aspects, the warning includes one or more of activating a light emitting device of the vehicle, or activating a sound emitting device of the vehicle. In some aspects, the warning includes sending a wireless signal to at least one of emergency services and a command center for teleoperation.

In some aspects, determining that the level of confidence of the received information from at least one sensor of the first subset of the set of two or more sensors is less than the first threshold includes comparing measurements received from sensors in the first subset of the set of two or more sensors to a measurement threshold, and determining whether the measurements received from the sensors in the first subset of the set of two or more sensors are less than or equal to the measurement threshold.

In some aspects, comparing measurements received from sensors in the first subset of the set of two or more sensors to the measurement threshold includes for each respective sensor in the first subset of the set of two or more sensors that the level of confidence of the received information is less than the first threshold, determining a sensor type and a coverage area of the respective sensor, identifying a third subset of other sensors of at least one of the same sensor type of the respective sensor or of the same coverage area, wherein each identified sensor in the third subset of other sensors does not have a level of confidence of the received information less than the first threshold, acquiring measurements received from the third subset of other sensors, and determining whether measurements received from each sensor in the third subset of other sensors compared to measurements received from the respective sensor in the first subset of sensors are greater than or equal to a sensor agreement threshold. In some aspects, upon determining that measurements received from each sensor in the third subset of other sensors compared to measurements received from each respective sensor in the first subset of the set of two or more sensors are greater than or equal to the sensor agreement threshold, the method further includes determining that the measurements received from the respective sensor in the first subset of sensors are less than or equal to the measurement threshold.

In some aspects, determining that a level of confidence of the received information from at least one sensor of a first subset of the set of two or more sensors is less than a first threshold includes comparing measurements received from sensors in the first subset of the set of two or more sensors to a range of values corresponding to a statistical confidence interval, and determining that the measurements received from the sensors in the first subset of the set of two or more sensors are outside the range of values corresponding to the statistical confidence interval.

In one aspect, a system includes a vehicle with a plurality of sensors and a first device with one or more processors and memory, the first device performing operations to adjust the driving capability of the vehicle using any one of the methods disclosed herein.

In one aspect, a non-transitory computer-readable medium encoding instructions operable to cause data processing apparatus to adjust the driving capability of a vehicle using any one of the methods disclosed herein.

In an embodiment, a method including performing a machine-executed operation involving instructions which, when executed by one or more computing devices, cause performance of any one of the methods disclosed herein, wherein the machine-executed operation is sending said instructions, receiving said instructions, storing said instructions, or executing said instructions.

These and other aspects, features, and embodiments can be expressed as methods, apparatus, systems, components, program products, means or steps for performing a function, and in other ways.

These and other aspects, features, and embodiments will become apparent from the following descriptions, including the claims.

DETAILED DESCRIPTION

Figure 1:
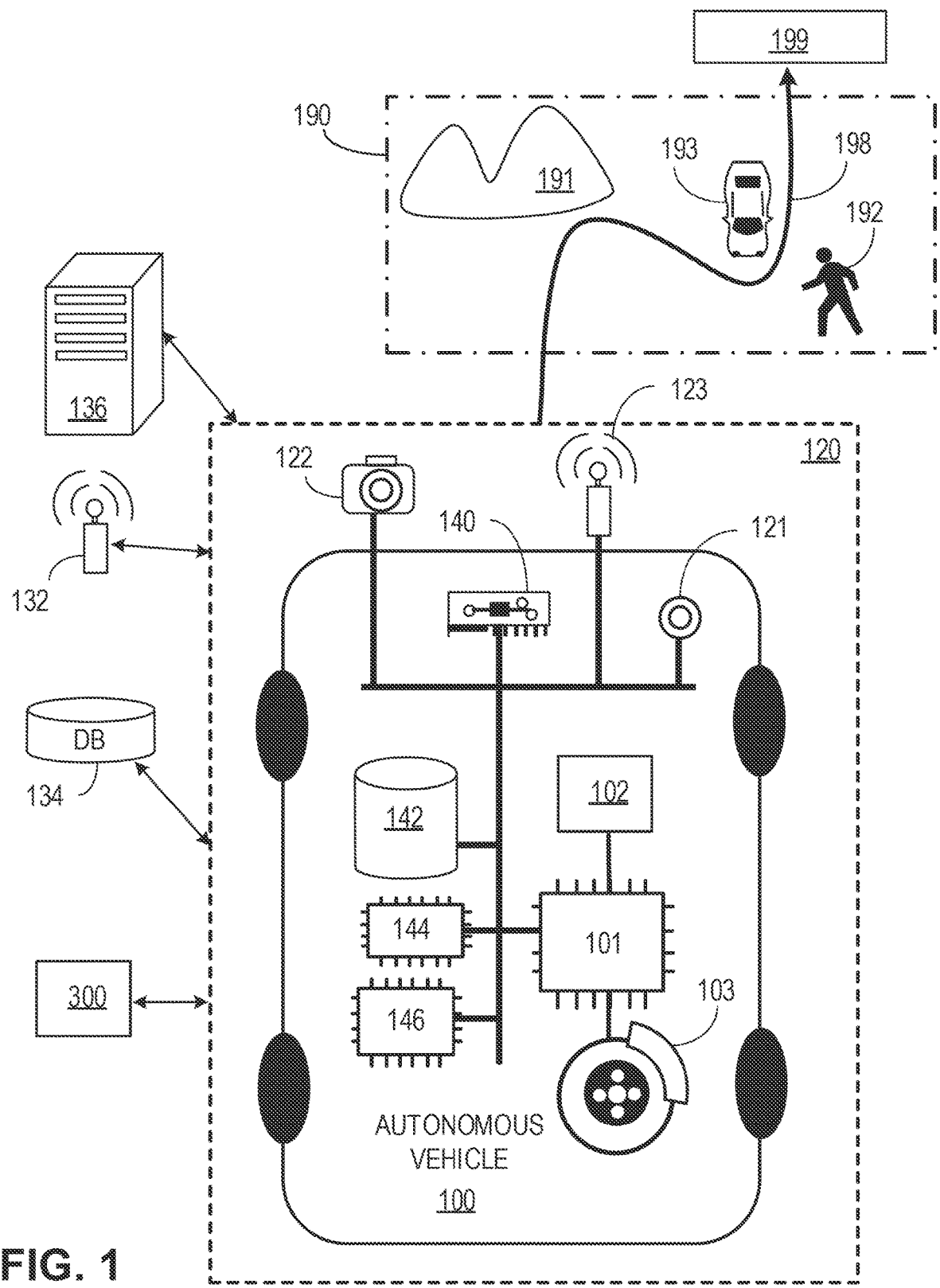
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Architecture for Implementing an Autonomous Vehicle Response to Sensor Failure
8. Processes for Implementing an Autonomous Vehicle Response to Sensor Failure General Overview An autonomous vehicle (AV) uses sensors (RADAR, LiDAR, GNSS [Global Navigation Satellite System], odometry, computer vision, etc.) to automatically sense and navigate an environment, but sometimes the sensors are prone to failure. Thus, in accordance with the techniques described herein, the AV can be controlled when a sensor fails, and can determine the next best course of action when a sensor fails, such as executing a safe stop maneuver, or utilizing different sensors. These sensors may fail due any number of factors including, for example, manufacturing defects, end of operational life, tampering, cascading system failure, physical damage, and the like. The loss of one or more sensors may impede the AVs ability to operate.

In an embodiment, a subset of sensors is determined to have failed when measurements are not received from some sensors within a predetermined time period. Additionally, or alternatively, a subset of sensors is determined to have failed when measurements received from some sensor is less than a threshold, outside a confidence interval, consistently differs from what is expected, or what is measured by similar other sensors. Upon detecting failure of one or more onboard sensors, an AV determines the next course of action depending on the type and the extent of the sensor failure. For example, if all right hand sensors fail, the AV may be unable to perform right turns, but the AV may still be able to navigate by performing left turns only. Additionally, or alternatively, if all sensors fail then the AV may come to a stop as soon as possible. Additionally, or alternatively, if a subset of sensors fail, the AV can readjust its driving by relying on the remaining working sensors.

In an embodiment, upon detecting failure of one or more onboard sensors, an AV executes a safe stop maneuver (hereinafter "Safe Stop") to protect the passengers travelling in the AV if any along with other vehicles nearby as well as the AV itself. Additionally, or alternatively, the AV is equipped with a specific button or other signaling device for a passenger to initiate a safe stop mode.

In another embodiment, the AV may enter a 'limp home mode.' In a limp home mode, the AV proceeds to the nearest service location, for example a charging station or fleet repair station, etc. For example, the AV may limp home after sensor failure by relying on a library of stored instructions according to the AV's location and historical data regarding traffic, pedestrians etc.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In an embodiment, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In an embodiment, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
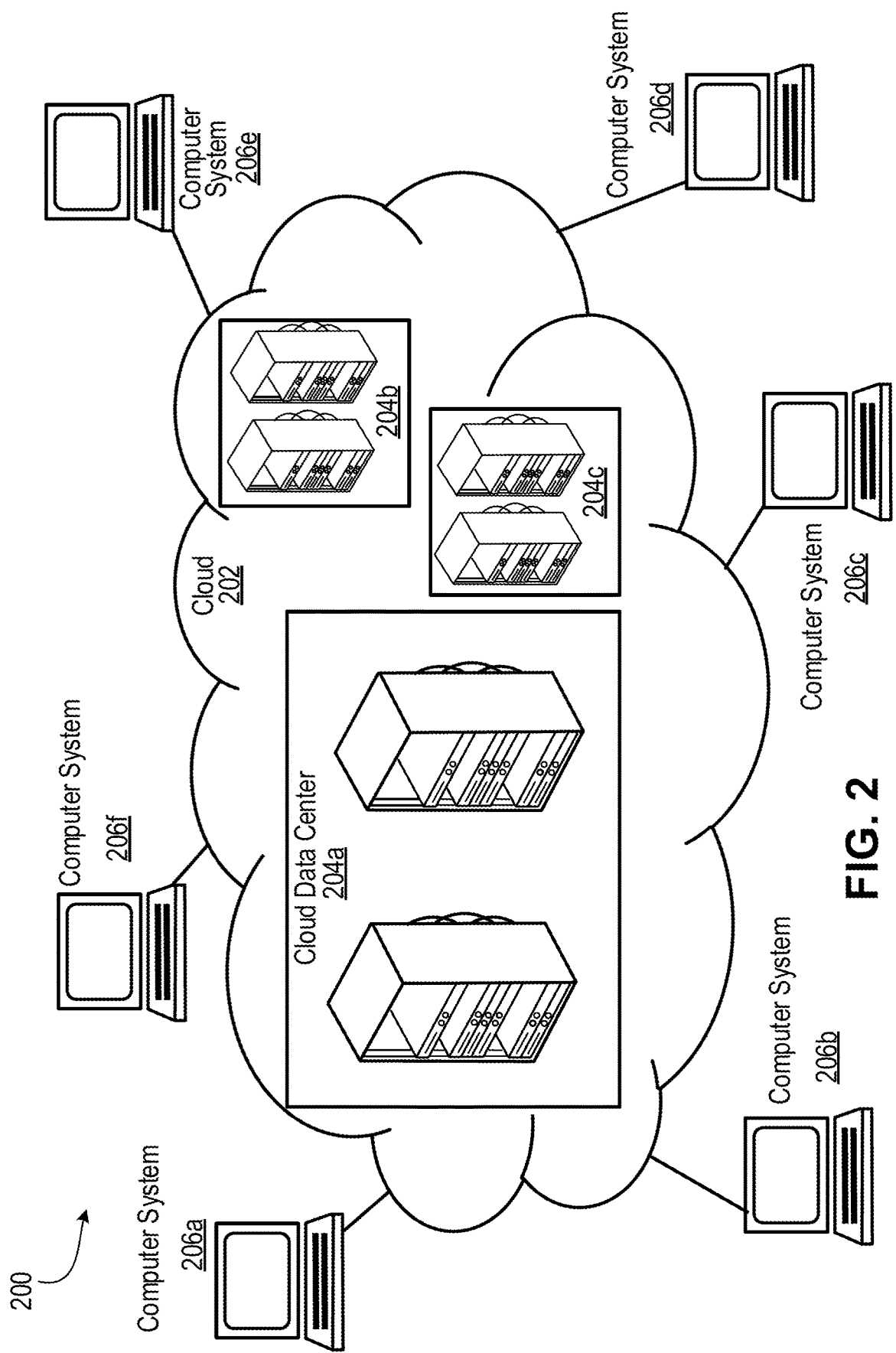
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some embodiment, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In an embodiment, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
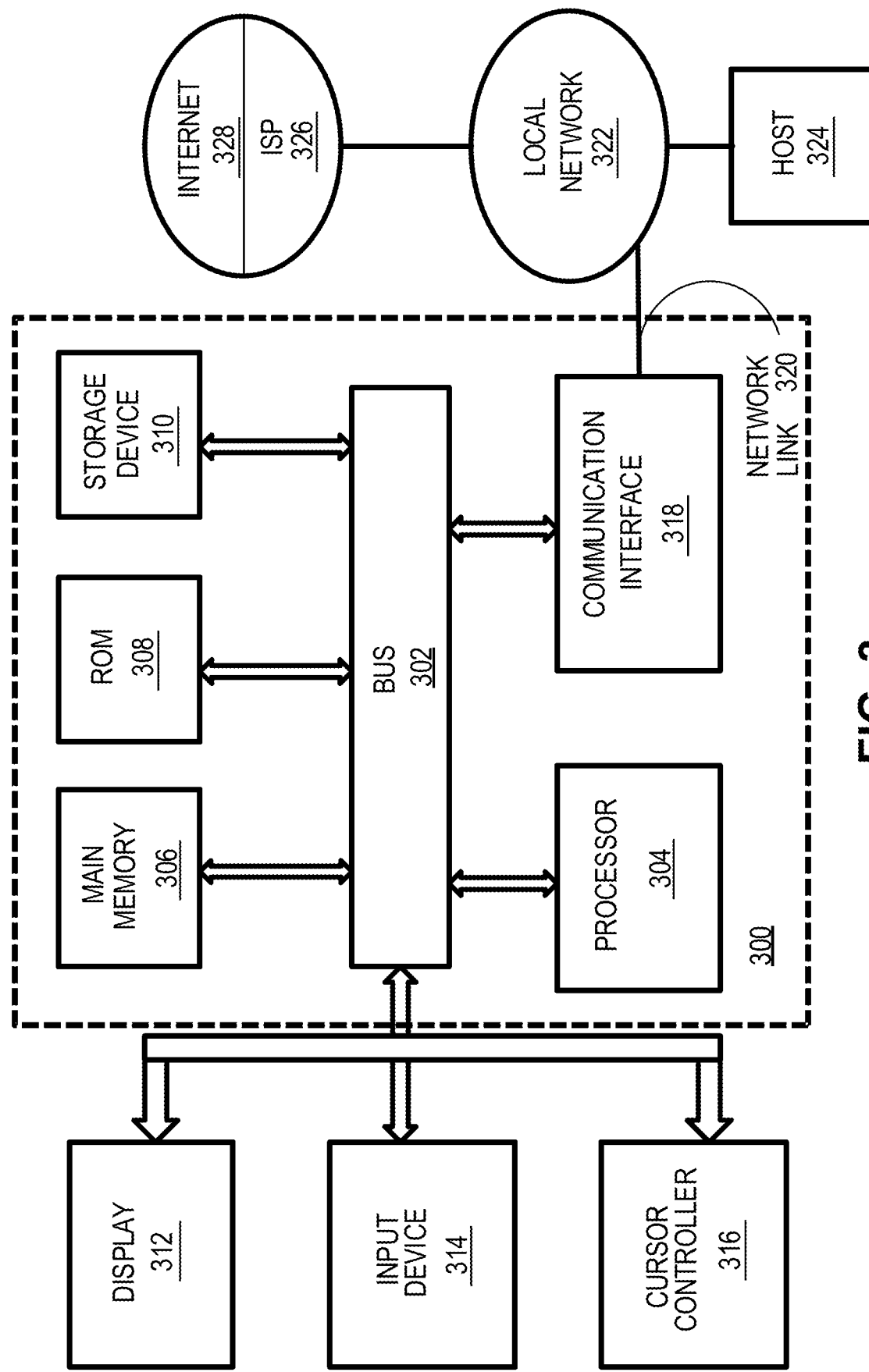
FIG. 3 illustrates a computer system.

FIG. 3 illustrates a computer system 300. In an embodiment, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In an embodiment, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to some embodiments, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In an embodiment, wireless links are also implemented. In any such embodiment, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
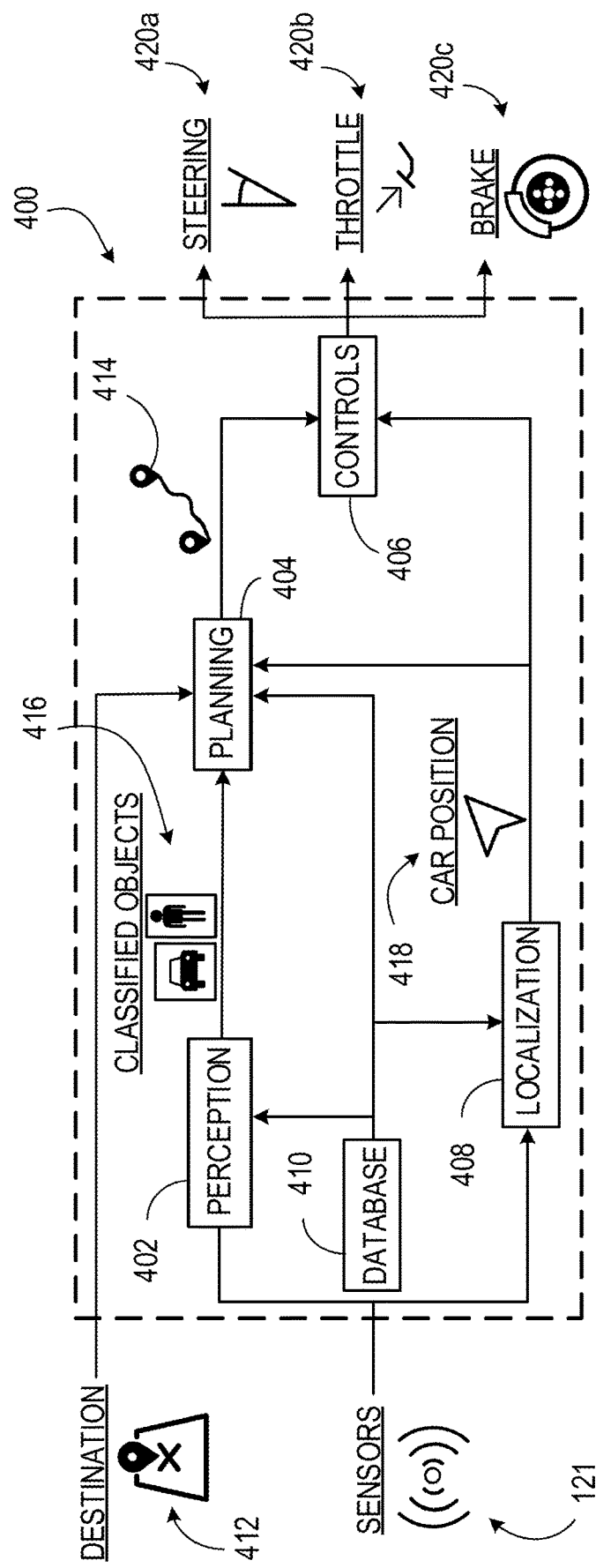
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In an embodiment, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
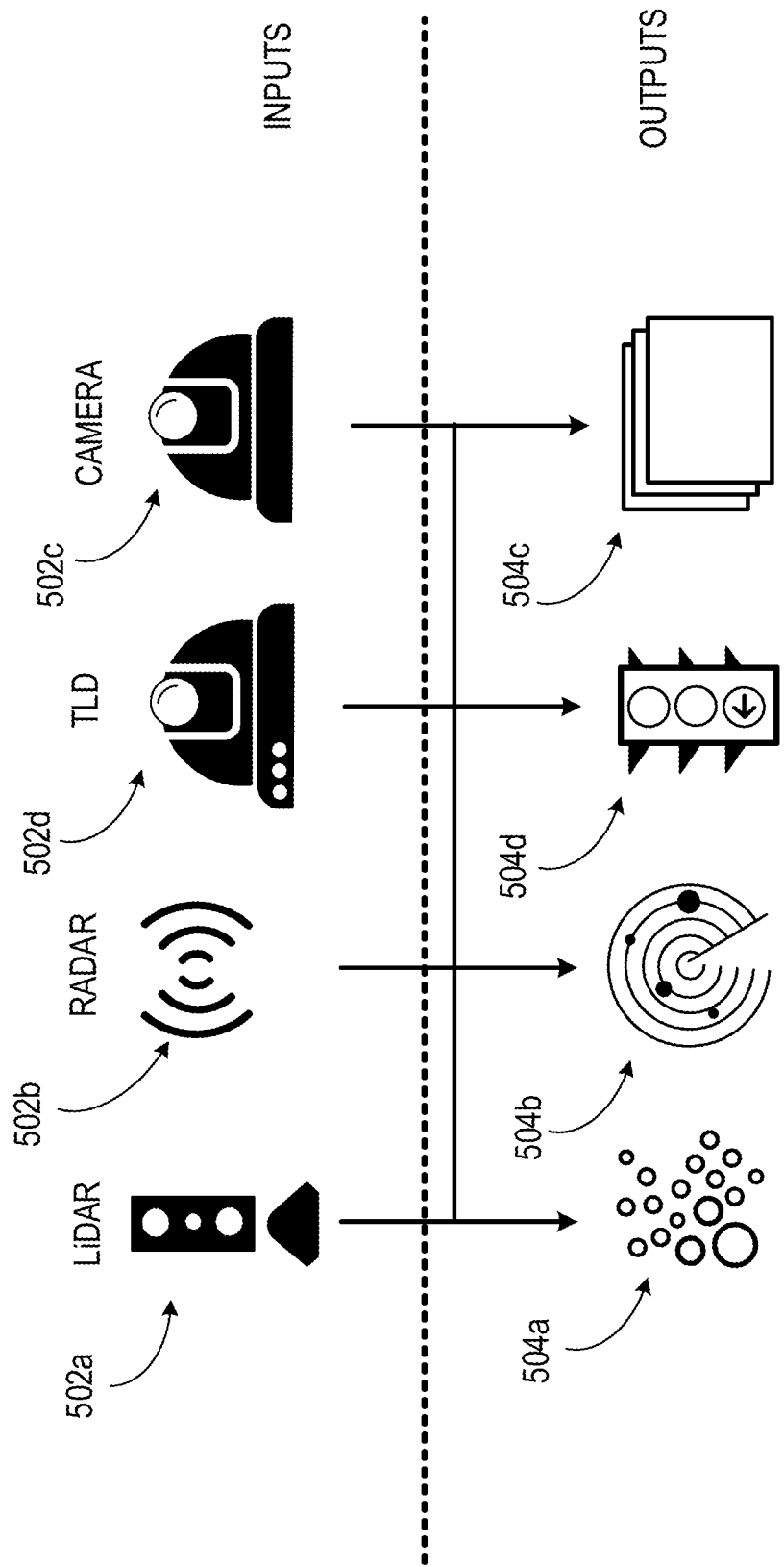
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In an embodiment, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In an embodiment, an early fusion technique is used. An early fusion technique is characterized by combining outputs before one or more data processing steps are applied to the combined output. In an embodiment, a late fusion technique is used. A late fusion technique is characterized by combining outputs after one or more data processing steps are applied to the individual outputs.

Figure 6:
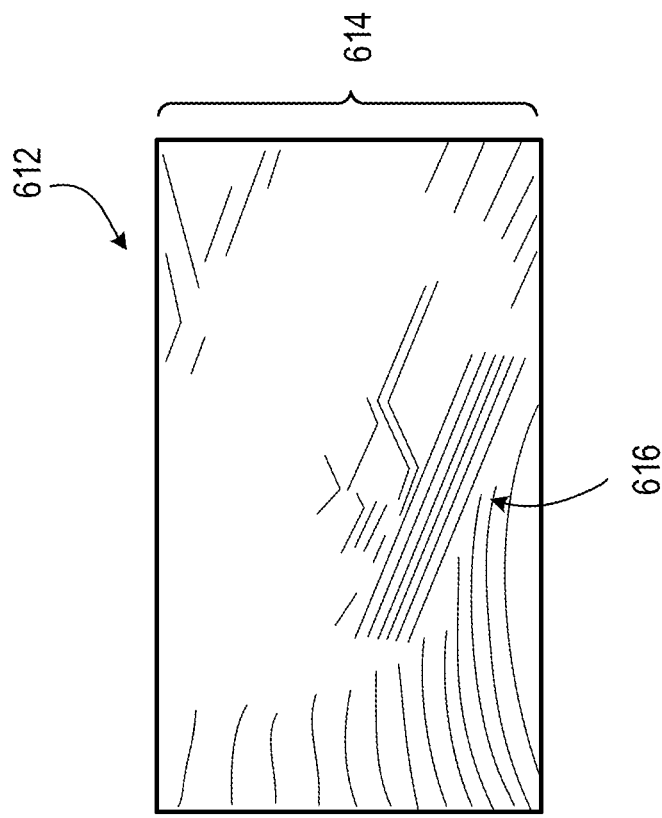
FIG. 6 shows an example of a LiDAR system.
Figure 6:
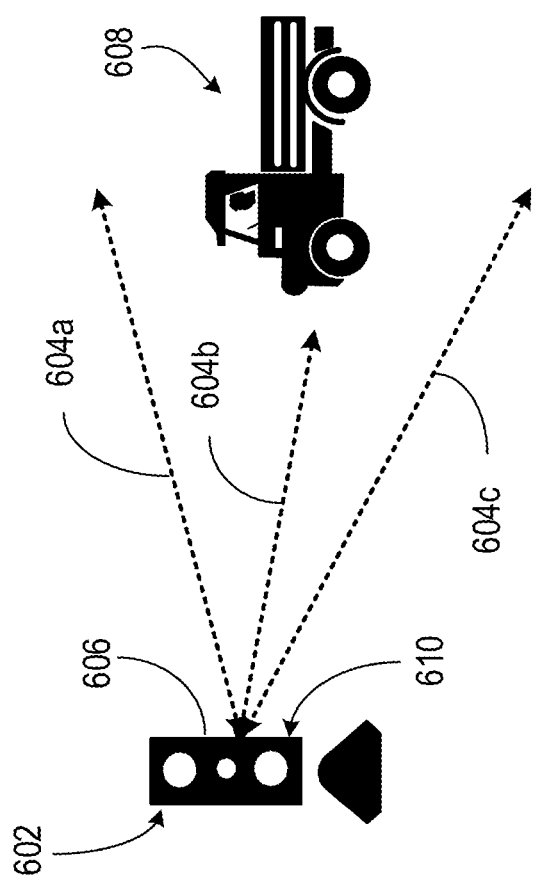

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
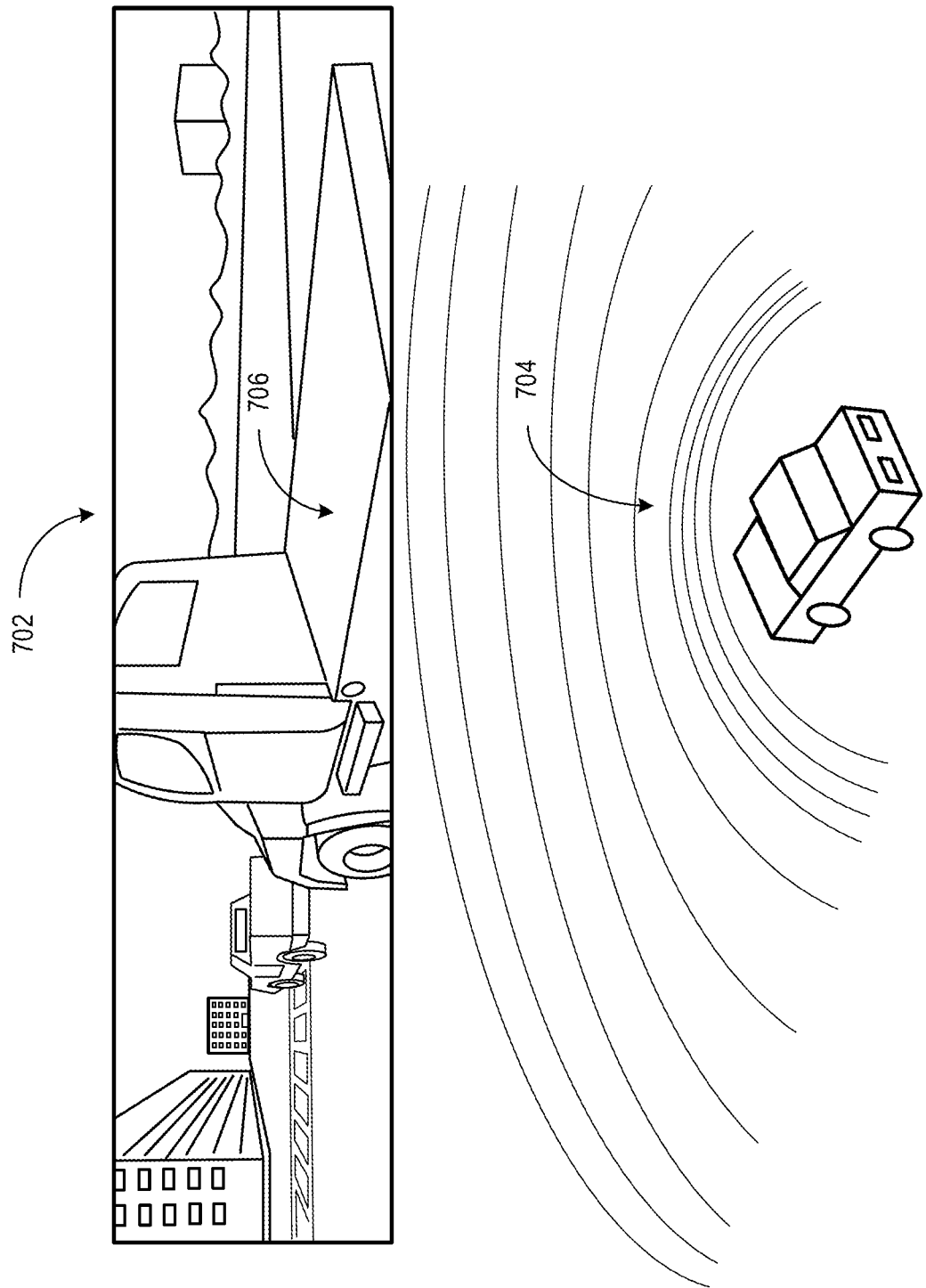
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
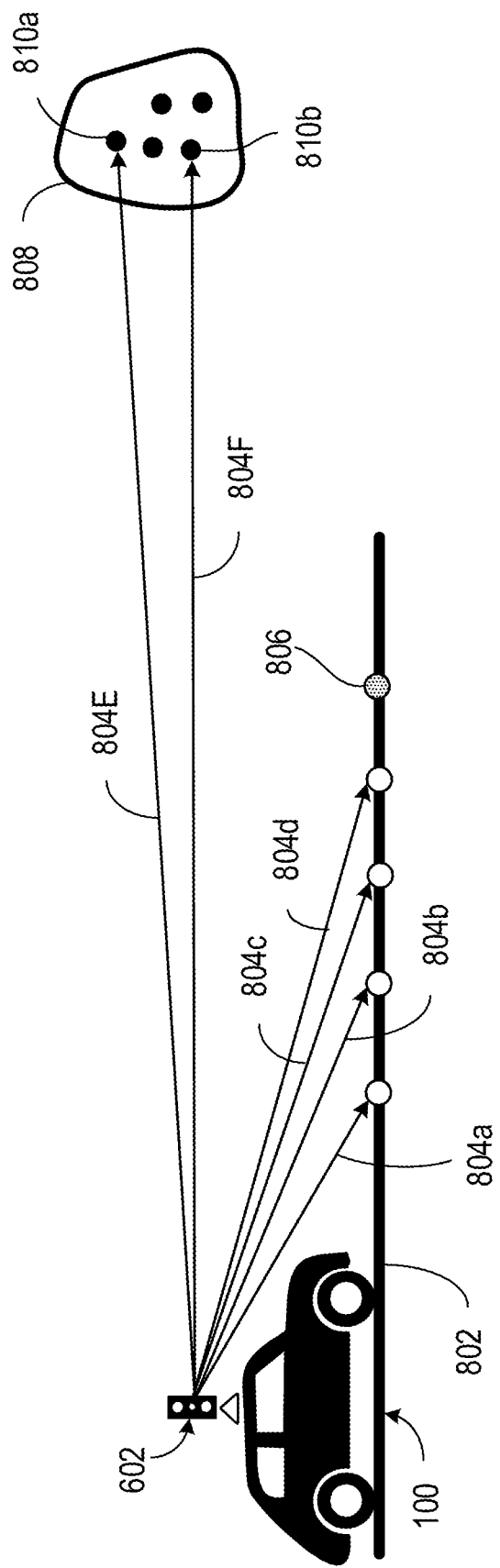
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
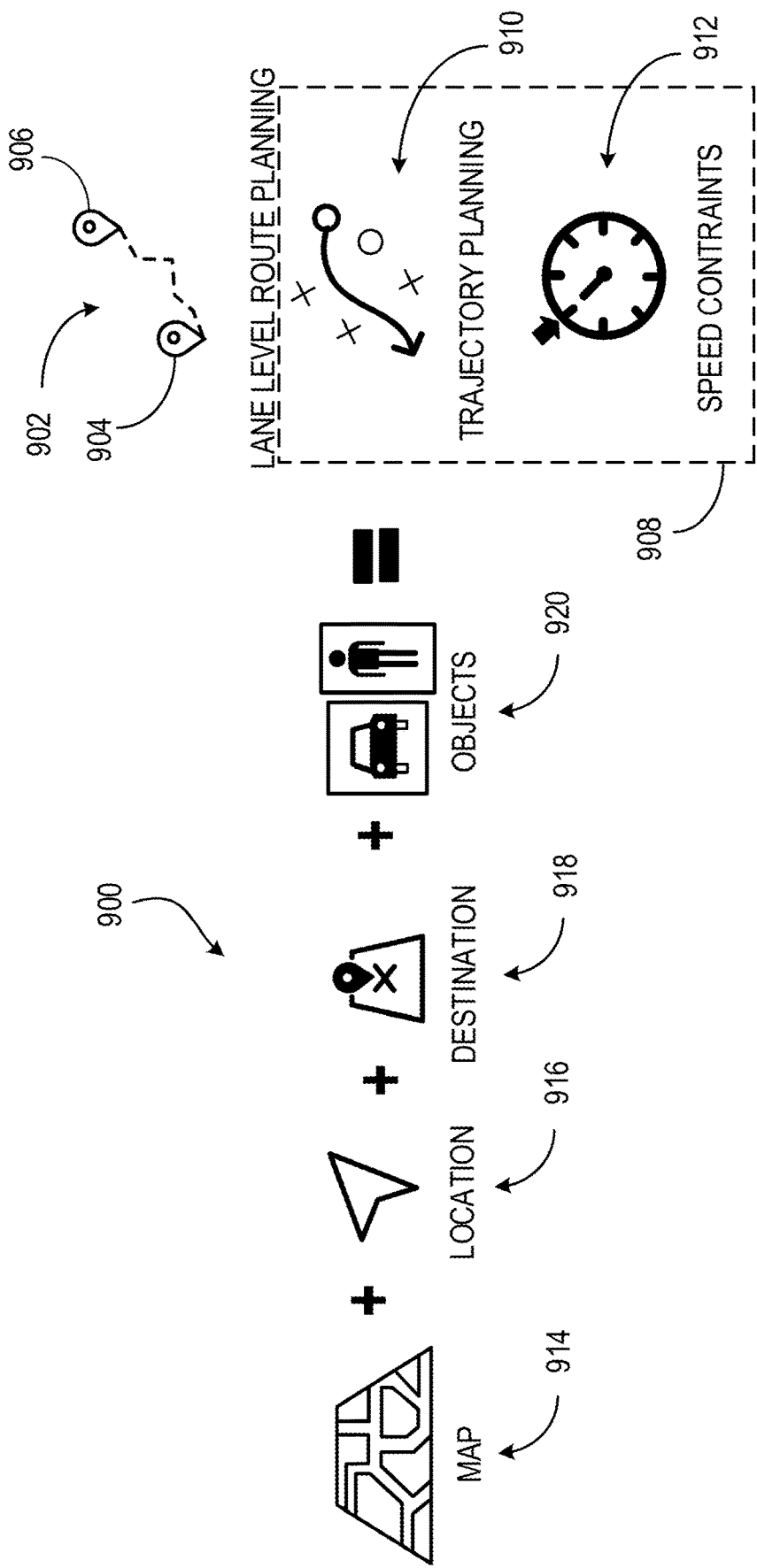
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in an embodiment, the lane-level route planning data 908 includes speed constraints 912 specific to a segment of the route 902. For example, if the segment includes pedestrians or un-expected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In an embodiment, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
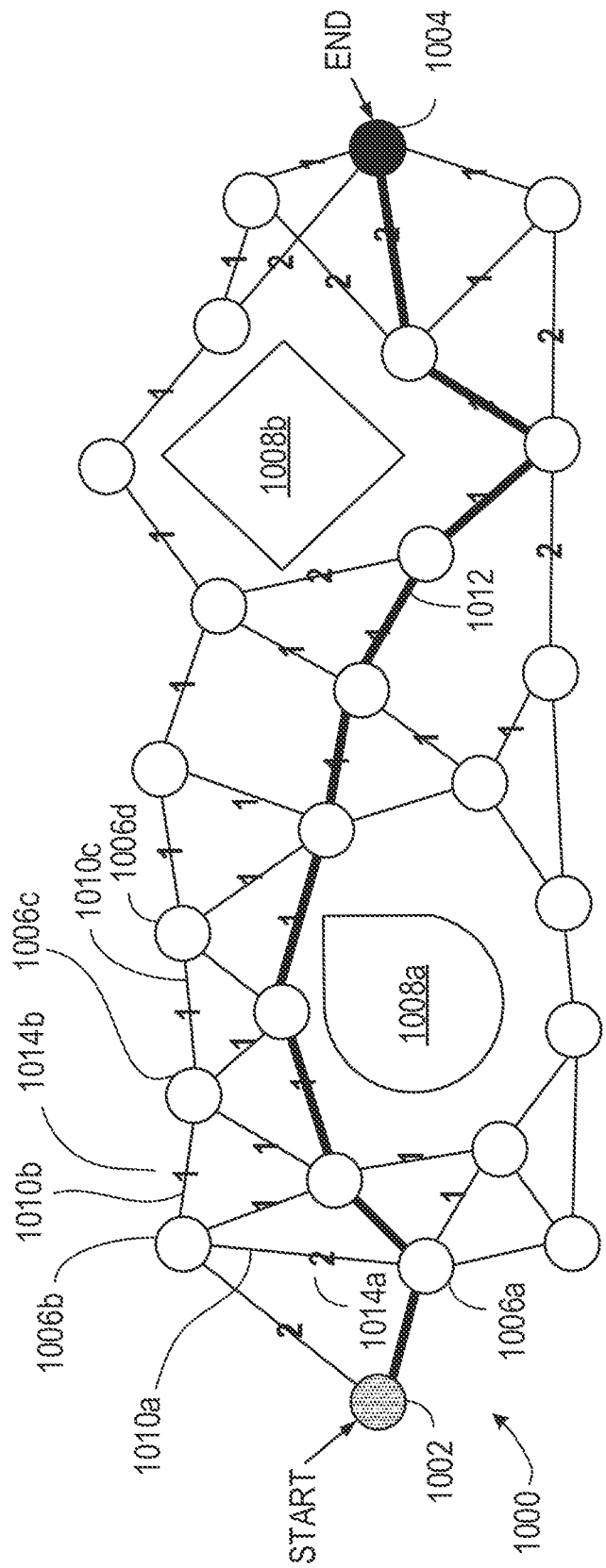
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
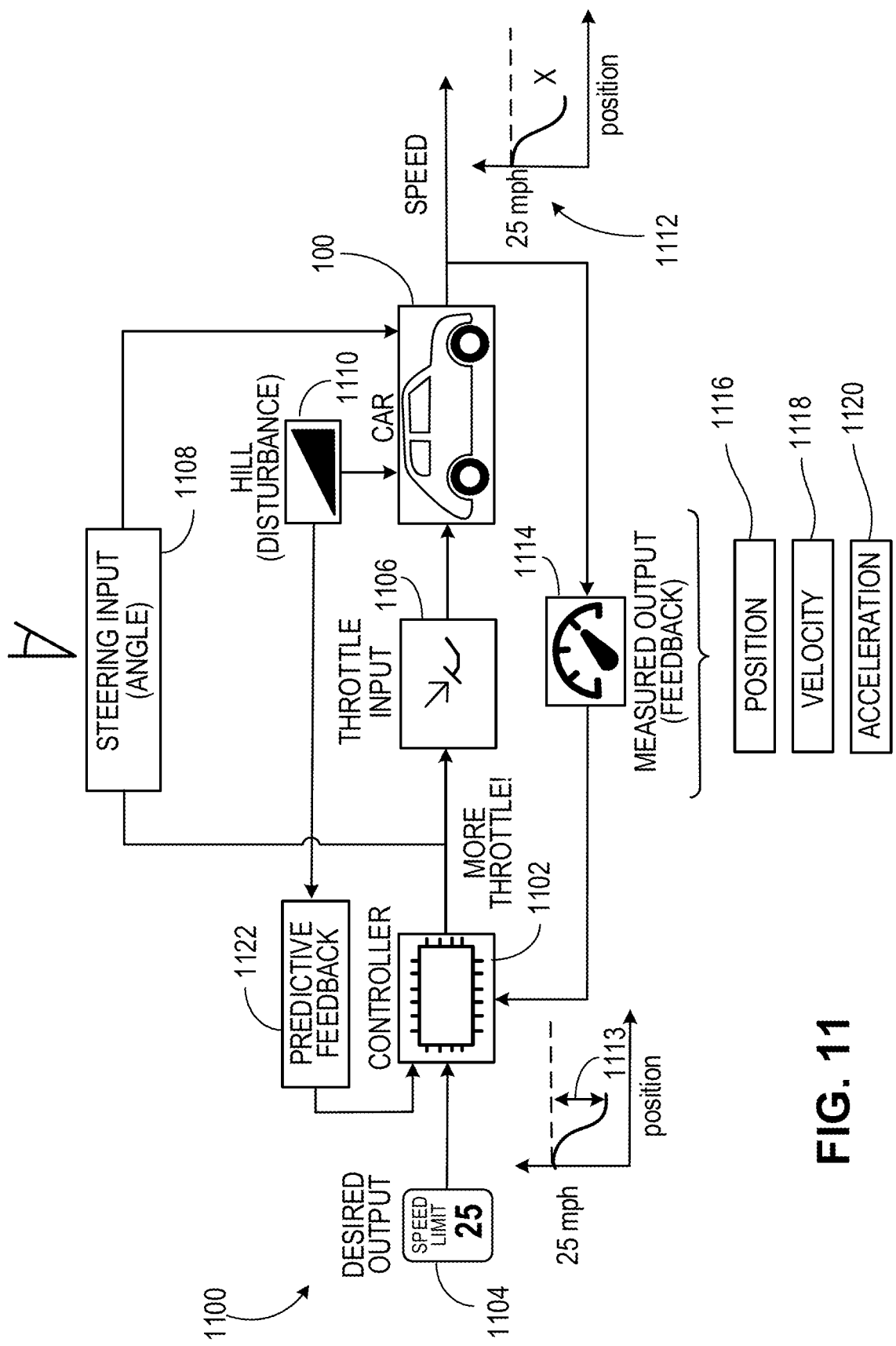
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
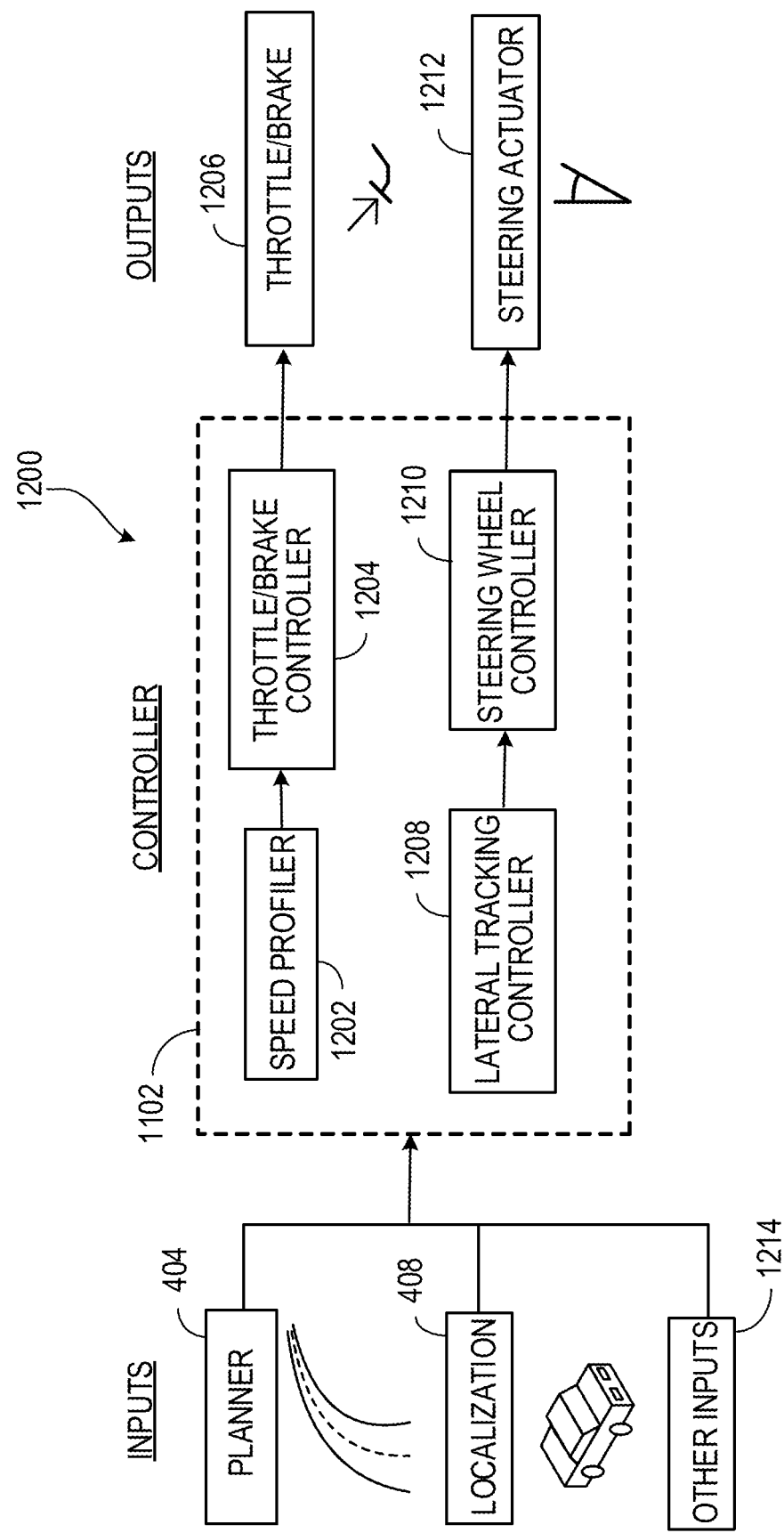
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Architecture for Implementing an Autonomous Vehicle Response to Sensor Failure

Figure 13:
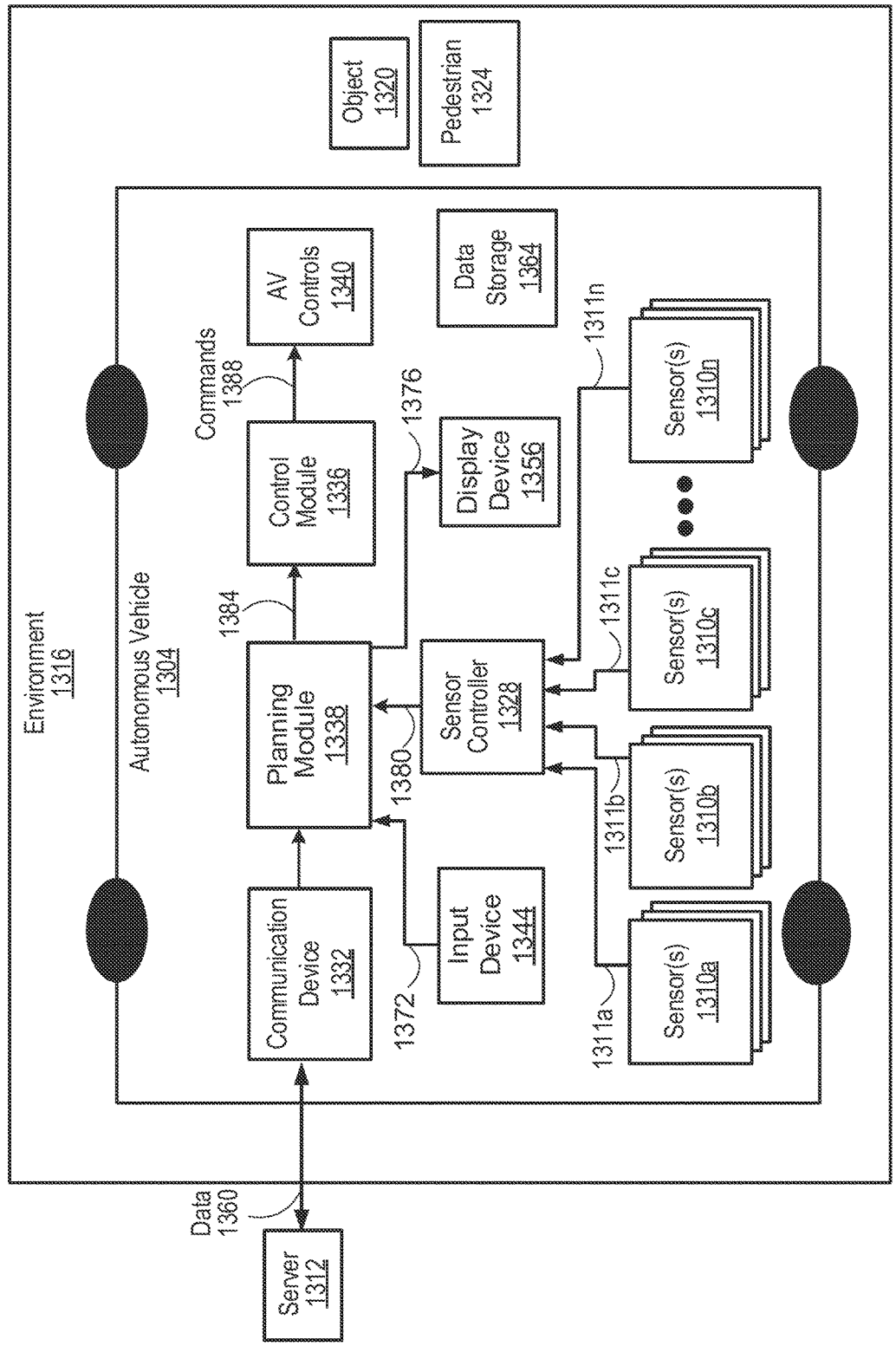
FIG. 13 shows a block diagram for implementing an autonomous vehicle response to sensor failure.

FIG. 13 illustrates a block diagram of an architecture 1300 for implementing an AV response to sensor failure during the operation of an AV 1304, in accordance with one or more embodiments. The architecture 1300 includes a remote server 1312 and an environment 1316 surrounding the AV 1304. The server 1312 may be an embodiment of the server 136 shown in FIG. 1 and the AV 1304 may be an embodiment of the AV 100 shown in FIG. 1.

Referring to FIG. 13, the AV 1304 navigates autonomously or semi-autonomously along a trajectory through the environment 1316. The environment 1316 may be an embodiment of the environment 190 illustrated and described above in detail with reference to FIG. 1. The environment 1316 represents a geographical area, such as a town, a neighborhood, or a road segment. In an embodiment, spatiotemporal locations within the environment 1316 are represented on an annotated map of the environment 1316. These spatiotemporal locations are used to generate a trajectory for the AV 1304. The environment 1316 contains the AV 1304, object 1320, and pedestrian 1324. In other embodiments, the architecture 1300 includes additional or fewer components than those described herein. Similarly, the functions can be distributed among the components and/or different entities in a different manner than is described here.

The server 1312 is communicatively coupled to the AV 1304 and transmits data to the AV 1304. In an embodiment, the server 1312 may be a "cloud" server as described in more detail above with reference to server 136 in FIGS. 1 and 2. Portions of the server 1312 may be implemented in software or hardware. For example, the server 1312 or a portion of the server 1312 may be part of a PC, a tablet PC, an STB, a smartphone, an internet of things (IoT) appliance, or any machine capable of executing instructions that specify actions to be taken by that machine.

The server 1312 stores data 1360 representing vehicle operation profiles for the AV 1304. The data 1360 representing vehicle operation profiles may be organized as a database or table of vehicle operation profiles stored on one or more of removable or non-removable memory devices, tape cassettes, and computer hard drives. In an embodiment, a vehicle operation profile includes multiple data fields, each describing one or more parameters of the vehicle operation profile. In one example, a vehicle operation profile includes sensor profiles for each sensor, and particular subsets of sensors, so the AV system, using the sensor controller 1328, can determine if a sensor, or a subset of sensors, has failed or is failing based on a level of confidence determined from received information from each sensor. In an embodiment, each sensor profile includes a set of ranges of operational parameters for the vehicle according to an operation level for that a particular sensor is able to operate at before being considered a failed sensor. In one example, a sensor profile includes an expected or allowed range of values for a speed, a longitudinal acceleration, an amplitude of fluctuation of acceleration, a lateral acceleration, a change in steering angle, a rate of turn of the AV 1304, or the like, that if sensor data is received by the sensor controller 1328 that is outside of the expected or allowed range of values, that particular sensor may be flagged or deemed as a failed sensor, or a sensor that is determined to have a level of confidence that is less than a confidence level threshold, by the AV 1304. The AV 1304 is instructed by the control module 1336 not to utilize a particular sensor if the sensor data is outside the operational parameters.

In an embodiment, the sensor profile may include a predetermined time period of when a sensor has not returned measurement data, measurements received from a particular sensor is less than a threshold, outside a confidence interval, consistently differs from what is expected, or what is measured by other, similar sensors. Additionally, or alternatively, the sensor profile includes a weight indicative of a corresponding importance of each sensor (e.g., importance depends on the impact of a sensor's data on one or more attributes, such as safety, perception, or drivability).

In an embodiment, the sensor profile includes a second threshold for a subset of sensor, such that the second threshold is the number of sensors in a particular subset of sensors that the AV 1304 would need for that particular subset to continue to operate the AV in safe manner. In particular, upon determining that the number of sensors in the subset is at least equal to the second threshold, the sensor controller 1328 can reconfigure one or more of the remainder of the plurality of sensors to adjust their respective coverage areas. For example, if a subset of sensors measures data for the right side of the AV 1304 totals seven sensors, and at least five sensors are required for safe operation, as stored in the sensor profile, if, for example, two sensors have been determined as failed or determined to have a level of confidence that is less than a confidence level threshold, the sensor controller 1328 can reconfigure the remaining five sensors in the particular subset to adjust the coverage area to cover the area that the two failed sensors were covering.

In an embodiment, the confidence level for each sensor can be represented in a continuous manner by defining the limit of perception's field of view, accuracy of localization's positioning, reduction of slip estimation due to a wheel speed sensor giving out, and the like. In an embodiment, there can be a continuous spectrum between nominal behavior and failure. For example, a LiDAR system can have a third of its field of view occluded. Thus, some of the sensor measurements from the LiDAR system are still valid.

In an embodiment, a sensor can be defined as a single data return, and a component's profile to be the circumstances that result in a failure (e.g. certain percentage of data returns failing, occlusion in a certain area, etc.). For example, a single point return from the LiDAR system.

In an embodiment, one or more sensor profiles are stored on the AV 1304 in the data storage unit 1364. The data storage 1364 is an embodiment of the data storage 142 or memory 144 shown in FIG. 1 and includes one or more of removable or non-removable memory devices, tape cassettes, and computer hard drives. The data storage 1364 includes multiple data fields, each describing one or more attributes of a sensor profile.

The object 1320 is a physical object external to the AV 1304. For example, the object 1320 may be an environmental feature such as a construction zone, a building, a traffic sign, a physical curb of a road, or a marking on a lane boundary, etc. The object 1320 may be another vehicle, a cyclist, or a pedestrian. In an embodiment, the object 1320 and the pedestrian 1324 are classified by the AV 1304 (e.g., grouped into types such as pedestrian, automobile, etc.) and data representing the classified object 1320 and pedestrian 1324 is provided to the planning module 1338 of the AV 1304 to generate a trajectory for the AV 1304. Objects that are external to the AV 1304 are described in more detail above with reference to objects 416 in FIG. 4.

The AV 1304 includes a communication device 1332, the planning module 1338, the sensor controller 1328, a control module 1336, AV controls 1340 (e.g., steering, brakes, throttle), an input device 1344, one or more sensors 1310a-1310n, a display device 1356, and the data storage 1364. The communication device 1332 may be an embodiment of the communication device 140 shown in FIG. 1, the planning module 1338 may be an embodiment of the planning module 404 shown in FIG. 4, the sensor controller 1328 may be an embodiment of the computer processors 146 in FIG. 1, the control module 1336 may be an embodiment of the control module 106 shown in FIG. 1, the AV controls 1340 may be an embodiment of the controls 420a—c shown in FIG. 4, the input device 1344 may be an embodiment of the input device 314 shown in FIG. 3, the one or more sensors 1310a-1310n may be an embodiment of the sensors 121-123 in FIG. 1, and the display device 1356 may be an embodiment of the display 312 shown in FIG. 3. In other embodiments, the AV 1304 includes additional or fewer components than those described herein. Similarly, the functions can be distributed among the components and/or different entities in a different manner than is described here.

The communication device 1332 communicates data 1360 (e.g., a vehicle operation profile, a passenger profile, sensor data profile, or the like) with the server 1312, the planning module 1338, a passenger within the AV 1304, or other vehicles. The communication device 1332 is communicatively coupled to the server 1312 across a network. In an embodiment, the communication device 1332 communicates across the Internet, an electromagnetic spectrum (including radio and optical communications), or other media (e.g., air and acoustic media). Portions of the communication device 1332 may be implemented in software or hardware. In one example, the communication device 1332 or a portion of the communication device 1332 is part of a PC, a tablet PC, an STB, a smartphone, an internet of things (IoT) appliance, or any machine capable of executing instructions that specify actions to be taken by that machine. The communication device 1332 is described in more detail above with reference to communication device 140 in FIG. 1.

The sensors 1310a-1310n communicate measured data 1311a-131n, respectively, to the sensor controller 1328. The sensors 1310a-1310n (sometimes referred to herein as sensors 1310), can include any one of the sensors 121-123 as discussed herein for FIG. 1. The sensor controller 1328 communicates sensor data 1380 to the planning module 1338.

In an embodiment, the sensors 1310a-1310n each include a set of sensors configured to measure a same or similar condition. In an embodiment, the sensors 1310a-1310n each include a set of sensors configured to measure a particular sides of the AV 1304, such as the right hand side, left hand side, back end, and/or front end of the AV 1304. For example, assume sensors 1310a are all sensors configured to measure the right hand side of the AV 1304 and sensors 1310b are all sensors configured to measure the left hand side of the AV 1304. If all right hand sensors fail, or all right hand sensors is determined to have a level of confidence that is less than the confidence level threshold, or if a particular number of sensors fail that falls below the threshold, the AV 1304 may be unable to perform right turns. However, the planning module 1338 may still be able to navigate the AV 1304 safely by performing left turns only. The decision to be able to perform only left hand turns can be determined by the planning module 1338, after receiving sensor failure information from sensor data 1380 from the sensor controller 1328.

The input device 1344 receives data 1372 from a passenger within the AV 1304. In an embodiment, the data 1372 represents instructions for driving, a preference for a vehicle operation profile, or a desired drive aggressiveness metric. The input device 1344 transmits the data 1372 to the planning module 1338. In an embodiment, the input device 1344 translates data 1372 from a human-readable format or natural language to a computer program, pseudocode, machine-language format, or assembly-level format for the planning module 1338 to use. The input device 1344 may include a touchscreen display or keyboard. The input device 1344 is described in more detail above with reference to the input device 314 and cursor controller 316 in FIG. 3.

The display device 1356 provides data 1376 to the driver and/or passenger(s) riding in the AV 1304. In an embodiment, the data 1376 represents display data a current status within the AV 1304, such as all systems are functioning properly. In another embodiment, the data 1376 represents the current vehicle operation profile of the AV 1304. In another embodiment, the data 1376 represents a specific button or other signaling device for a passenger to initiate a safe stop mode. For example, the display data 1376 could indicate to the passenger(s) of a failed sensor in the AV 1304, display which particular sensor that failed or is determined to have a level of confidence that is less than a confidence level threshold, and whether the vehicle needs to initiate an immediate safety stop, needs to be quickly serviced, or can continue safely with the remaining sensors that can still safely monitor the environment 1316.

The planning module 1338 determines the vehicle operation profile for the AV 1304 and updates the vehicle operation profile based on the measured data 1311 could include sensor data, such as data discussed herein for sensors 121-123 in FIG. 1. The planning module 1338 is communicatively coupled to the communication device 1332 to receive instructions or data representing a vehicle operation profile, a stored passenger profile, sensor profiles for each sensor, and the like, from the server 1312. The planning module 1338 is communicatively coupled to the sensor controller 1328 to receive the data 1380 which includes the sensor data. The sensor controller 1328 is communicatively coupled to the sensors 1310a-1310n to receive the measured data 1311a-1311n. The planning module 1338 is communicatively coupled to the input device 1344 to receive data 1372 representing passenger preferences. The planning module 1338 is communicatively coupled to the display device 1356 to transmit data 1376 representing display data.

In an embodiment, portions of the planning module 1338 are implemented in software or hardware. For example, the planning module 1338 or a portion of the planning module 1338 may be part of a PC, a tablet PC, an STB, a smartphone, an internet of things (IoT) appliance, or any machine capable of executing instructions that specify actions to be taken by that machine. The planning module 1338 is described in more detail above with reference to planning module 404 in FIG. 4.

The planning module 1338 updates the vehicle operation profile based on the received data 1380, which was compiled by the sensor controller 1328 of the measured data 1311a—n from each of the sensors 1310a—n. In an embodiment, the AV's 1304 vehicle operation profile is treated as a controlled system. The input to the system includes the vehicle operation profile, while the system's status is measured by the sensors 1310a—n.

In an embodiment, the planning module 1338 updates the vehicle operation profile by determining whether a sensor 1310, or a subset of sensors 1310, has failed or is determined to have a level of confidence that is less than a confidence level threshold in the AV 1304. For example, if all right hand sensors fail, the AV may be unable to perform right turns, but the AV may still be able to navigate by performing left turns only. The planning module 1338 adjusts the vehicle operation profile 1384 based on the failed subset of sensors, to plan a new destination to a service stop to fix the sensors. In another embodiment, the AV may enter a 'limp home mode.' In a limp home mode, the AV proceeds to the nearest service location, for example a charging station or fleet repair station, etc. For example, the AV may limp home after sensor failure by relying on a library of stored instructions according to the AV's location and historical data regarding traffic, pedestrians etc.

Additionally, or alternatively, if all sensors fail, the planning module 1338 can adjust the vehicle operation profile 1384 to come to a stop as soon as possible. Additionally, or alternatively, if a subset of sensors fail, the AV can readjust its driving by relying on the remaining working sensors. In an embodiment, upon detecting failure of one or more onboard sensors, an AV executes a safe stop maneuver (hereinafter "Safe Stop") to protect the passengers travelling in the AV if any along with other vehicles nearby as well as the AV itself. Additionally, or alternatively, the AV is equipped with a specific button or other signaling device for a passenger to initiate a safe stop mode.

In an embodiment, the planning module 1338 determines or adjusts a trajectory (e.g., 414 in FIG. 4) of the AV 1304 based on the data 1311 from sensors 1310. The planning module 1338 uses a directed graph representation of the road network to generate the trajectory including a plurality of travel segments. Each travel segment (e.g., edge 1010*a* in FIG. 10) represents a portion of the trajectory 414. Each travel segment in the trajectory is associated with a level of sensor data (e.g., stored from previous rides). The planning module 1338 evaluates the cost of navigating the AV 1304 along a particular trajectory. The planning module 1338 determines or adjusts the trajectory for the AV 1304 based on the sensor data 1311.

In an alternative embodiment, the planning module 1338 receives, using the input device 1344, data 1372 from a passenger representing a preferred destination or a selection of a mode in view of a sensor failing notification. The planning module 1338 adjusts the vehicle operation profile based on the selected mode. For example, the passenger may prefer a limp home mode instead of a safe stop mode, if the AV 1304 is capable of performing the limp home mode safely.

The control module 1336 is communicatively coupled to the planning module 1338. The control module 1336 receives data 1384 representing an updated vehicle operation profile and the present AV position (e.g., 418 in FIG. 4), and operates the AV controls 1340 in a manner that will cause the AV 1304 to operate according to the updated vehicle operation profile 1384. The control module 1336 navigates the AV 1304 by issuing one or more of throttle, braking, and steering commands 1388 in accordance with the updated vehicle performance profile 1384. In an embodiment, portions of the control module 1336 are implemented in software or hardware. For example, the control module 1336 or a portion of the control module 1336 may be part of a PC, a tablet PC, an STB, a smartphone, an internet of things (IoT) appliance, or any machine capable of executing instructions that specify actions to be taken by that machine. The control module 1336 is described in more detail above with reference to control module 406 in FIG. 4 and the corresponding block diagram 1100 of the control module 406 in FIG. 11.

The AV controls 1340 receive the commands 1388 from the control module 1336 and adjust the steering, brakes, and throttle of the AV 1304. In an embodiment, portions of the AV controls 1340 are implemented in software or hardware. For example, the AV controls 1340 or a portion of the AV controls 1340 may be part of a PC, a tablet PC, an STB, a smartphone, an internet of things (IoT) appliance, or any machine capable of executing instructions that specify actions to be taken by that machine. The AV controls 1340 are described in more detail above with reference to modules 406 and 420*a*—c in FIG. 4.

Among the benefits and advantages of the embodiments disclosed herein are that the updated vehicle operation profile based on the sensor data provides an ability for the AV 1304 to still function and drive safely even if a sensor has failed or is determined to have a level of confidence that is less than a confidence level threshold. By using sensor data disclosed herein, the AV 1304 ensures that the AV 1304 will come to a stop, if a subset of sensors has failed or is determined to have a level of confidence that is less than a confidence level threshold, or a certain number above a threshold of sensors has failed or is determined to have a level of confidence that is less than a confidence level threshold, that will prevent the AV 1304 from reaching an intended destination safely.

Processes for Implementing an Autonomous Vehicle Response to Sensor Failure

Figure 14:
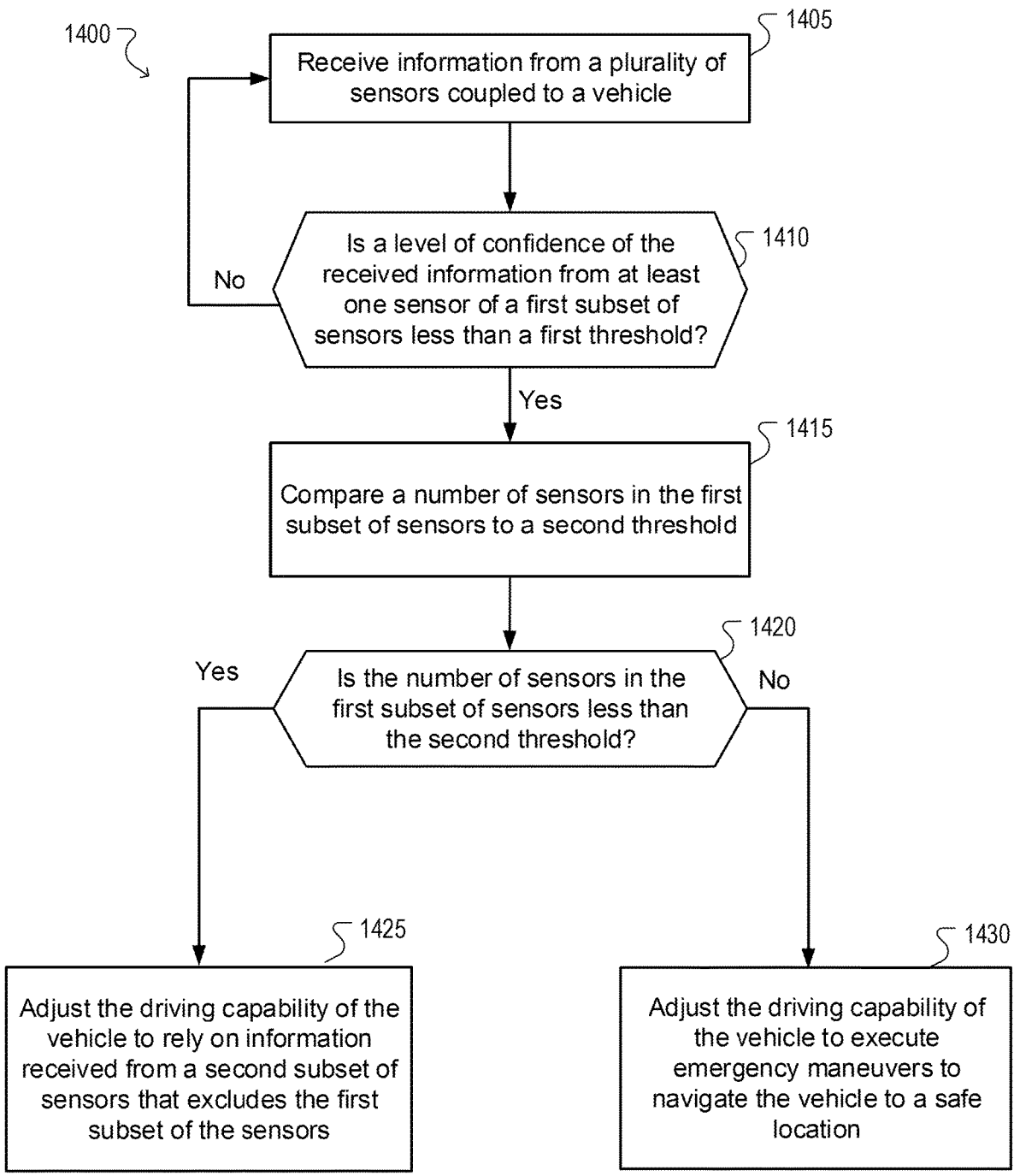
FIG. 14 illustrates a process for implementing an autonomous vehicle response to sensor failure.

FIG. 14 illustrates a process 1400 for implementing an autonomous vehicle response to sensor failure during the operation of an autonomous vehicle, such as AV 1304 of FIG. 13, in accordance with one or more embodiments. In an embodiment, the process 1400 of FIG. 14 is performed by one or more components (e.g., the sensor controller 1328 and/or the planning module 1338 in FIG. 13) of the AV 1304. Other entities (e.g., a remote server 1312 in FIG. 13) perform some or all of the steps of the process 1400 in other embodiments. Likewise, embodiments may include different and/or additional steps, or perform the steps in different orders.

At 1405, the autonomous vehicle receives information from a plurality of sensors coupled to the vehicle. Various examples of sensors include LiDAR, RADAR, camera, RF, ultrasound, infrared, and ultraviolet, such as sensors 121-123 in FIG. 1, discussed herein. Other types of sensors are possible. The information from the sensors includes various measured parameters from the autonomous vehicle's environment. For example, the information from the sensors 1310*a*-1310*n* is received by the sensor controller 1328, which is then sent to the AV 1304's planning module 1338.

At 1410, the autonomous vehicle determines whether a level of confidence of the received information from at least one sensor of a first subset of sensors is less than a first threshold. If the autonomous vehicle determines that the first subset of sensors of the plurality of sensors did not fail or the level of confidence is less than the confidence level threshold of each particular sensor, then the autonomous vehicle continues to receive information from the plurality of sensors and monitor for any sensor failures. For example, after receiving the sensor information from the sensors 1310 by the sensor controller 1328, the sensor controller 1328 determines whether a subset of sensors of the plurality of sensors has a level of confidence that is less than the confidence level threshold of each particular sensor. In an embodiment, the confidence level for each sensor can be represented in a continuous manner by defining the limit of perception's field of view, accuracy of localization's positioning, reduction of slip estimation due to a wheel speed sensor giving out, and the like. In an embodiment, there can be a continuous spectrum between nominal behavior, the level of confidence of a sensor, and failure. For example, a LiDAR system can have a third of its field of view occluded. Thus, some of the sensor measurements from the LiDAR system are still valid.

In an embodiment, a sensor can be defined as a single data return, and a component's profile to be the circumstances that result in a failure (e.g. certain percentage of data returns failing, occlusion in a certain area, etc.). For example, a single point return from the LiDAR system.

In an embodiment, a subset of sensors is determined to have failed or determined that a level of confidence for each sensor is less than the confidence level threshold by the sensor controller 1328 when a threshold field of view coverage is exceeded. For example, a LiDAR sensor can have a field of view coverage threshold set at 30%, which means a confidence level threshold would be 70%. If the sensor data revealed that 40% of its field of view was occluded, than that particular LiDAR sensor would have a determined level of confidence at 60%. Thus, the particular LiDAR sensor would be determined to have a level of confidence (e.g., 60%) that is less than the confidence level threshold (e.g., 70%) by the sensor controller 1328.

In an embodiment, a subset of sensors is determined to have failed or determined that a level of confidence for each sensor is less than the confidence level threshold by the sensor controller 1328 when measurements are not received from a sensor 1310 within a predetermined time period, such as, for example, five seconds. The predetermined time period for not receiving a signal to be thus determined as failed, or determined that a level of confidence for each sensor is less than the confidence level threshold, can range for each sensor from one second to thirty seconds, or even longer. Additionally, or alternatively, the range for each sensor can depend on the type of sensor, manufacturer settings, and other similar attributes for each sensor. For example, temperature sensors may be set to take measurements every thirty seconds, thus the predetermined time period for not receiving a signal to be thus determined as failed may be set at one minute. While wheel speed sensors for measuring or estimating wheel slip ratios, wheel brake pressure or braking torque sensors may be taking measurements constantly, e.g., in millisecond intervals, thus the predetermined time period for not receiving a signal to be thus determined as failed may be set at five seconds.

In an embodiment, the predetermined time period can be set by the sensor controller 1328, such as with an initial sensor profile for each sensor. The sensor profile can be stored in the data storage 1364, or other memory storage in the AV 1304 that the sensor controller 1328 can access. In an embodiment, the predetermined time period can be a time limit as determined by the sensor profile as received via data 1360 from the server 1312, as discussed herein.

In an embodiment, determining that a first subset of sensors of the plurality of sensors has failed or determined that a level of confidence for each sensor is less than the confidence level threshold of each particular sensor includes comparing measurements received from sensors in the first subset of sensors to a range of values corresponding to a statistical confidence interval (e.g., a range of values within which the sensor measurements are accepted as accurate), and determining that the measurements received from the sensors in the first subset of sensors are outside the range of values corresponding to the statistical confidence interval.

In an embodiment, determining that a first subset of sensors of the plurality of sensors has failed or determined that a level of confidence for each sensor is less than the confidence level threshold of each particular sensor includes comparing measurements received from sensors in the subset of sensors to a measurement threshold, and determining that the measurements received from the sensors in the first subset of sensors are less than or equal to the measurement threshold. For example, the AV 1304 can use a threshold value to determine sensor failure by comparing a degree of loss in perception with a known threshold value.

In an embodiment, comparing measurements received from sensors in the first subset of sensors to the measurement threshold includes, for each respective sensor in the first subset of sensors that determined that a level of confidence for each sensor is less than the confidence level threshold of each particular sensor or has failed, determining a sensor type and a coverage area of the respective sensor. After a particular sensor type and coverage area for the respective sensor is determined (e.g., a right hand side LiDAR sensor), a third subset of other sensors of at least one of the same type of sensor or of the same coverage area is identified, wherein each identified sensor in the third subset of other sensors does not have a level of confidence of the received information less than the confidence level threshold (e.g., other right hand side sensors, or other LiDAR sensors with similar coverage area at the right hand side). Then, after acquiring measurements received from the third subset of other sensors, the process includes determining whether measurements received from each sensor in the third subset of other sensors compared to measurements received from the respective sensor in the first subset of sensors are greater than or equal to a sensor agreement threshold.

In an embodiment, if it is determined that measurements received from each sensor in the third subset of other sensors compared to measurements received from each respective sensor in the first subset of sensors are greater than or equal to the sensor agreement threshold, then it is determined that the measurements received from the respective sensor in the first subset of sensors are less than or equal to the measurement threshold. For example, the AV 1304 using the sensor controller 1328 can compare a sensor has a low level of confidence below the confidence level threshold of that particular sensor, to other sensors in the same coverage area or of the same type of sensor to determine if the different sensors are in statistical agreement (e.g., within a certain percentage). Thus, the measurement threshold is not necessarily a static value as the system can compare the sensor measurements in the first subset of sensors to other similar sensors in the same area or the same sensor type, and determine if those sensors are reading similar measurements that are causing the level of confidence to be below the confidence level threshold. In other words, it may be possible that the failed sensor has not failed, but detected similar results as other similar sensors. In either scenario, if multiple sensors are detecting measurement data below their respective confidence level thresholds, the AV 1304 may adjust the driving capability of the vehicle to execute emergency maneuvers to navigate the vehicle to a safe location to address the sensor issues.

In an embodiment, a subset of sensors is determined to have failed or is determined to have a level of confidence that is less than the confidence level threshold of each particular sensor when measurements received from a particular sensor are consistently different from what is expected. For example, for a particular sensor, there is a range of values that would be expected during normal travel of the AV 1304, such as speed, temperature, etc. If, for example, a particular sensor was measuring a level that was not within that expected range of values, the sensor controller 1328 may determine that the particular sensor has failed, or at least is determined to have a level of confidence that is less than a confidence level threshold. Additionally, or alternatively, a subset of sensors is determined to have failed or is determined to have a level of confidence that is less than a confidence level threshold when measurements received from a particular sensor is consistently different from what is measured by other, similar sensors. For example, for a particular subset of sensors that are measuring a similar attribute, such as speed, if one sensor was measuring the speed of the AV 1304 at 80 km/h, but other sensors were consistently measuring a speed that deviated from that particular sensor, such as 60 km/h, then the sensor controller

1328 may determine that the particular sensor has failed or is determined to have a level of confidence that is less than a confidence level threshold.

At 1415, in response to determining that the subset of sensors of the plurality of sensors has failed or a level of confidence of the received information from at least one sensor of the first subset of sensors is less than a confidence level threshold of each particular sensor, the sensor controller 1328 compares a number of sensors in the first subset of sensors that failed or is determined to have a level of confidence that is less than the confidence level threshold to a second threshold. For example, for a particular subset of sensors, e.g., the right hand side sensors which are assigned sensors 1310a as shown in FIG. 13, there may be ten different sensors monitoring the right hand side of the AV 1304. Those right hand side sensors are considered a right hand side subset by the sensor controller 1328. Each particular subset of sensors, is assigned a particular number by the system for the second threshold, such as by the sensor controller 1328. For example, the right hand side subset of sensors may include ten sensors, the second threshold may be set at five sensors. Thus, for example, if four or less sensors that have a level of confidence that is less than the confidence level threshold (i.e. the number of sensors in the first subset of sensors is less than the second threshold), then the process 1400 would proceed to step 1425. However, if there are five or more sensors that have a level of confidence that is less than the confidence level threshold (i.e. the number of sensors in the first subset of sensors is not less than the second threshold), then the process 1400 would proceed to step 1430.

In an embodiment, each sensor is allocated a weight indicative of a corresponding importance of the sensor (e.g., importance depends on the impact of a sensor's data on one or more attributes, such as safety, perception, or drivability), and comparing the number of sensors in the first subset to the second threshold includes weighting each sensor in the subset of sensors according to a respective weight, and comparing a weighted number of the sensors in the first subset to the second threshold. For example, for a particular subset of sensors, e.g., the right hand side sensors, each sensor is individually weighted corresponding to an importance of each particular sensor. For example, a temperature sensor for the right hand side would not be as important as a proximity sensor, such as a LiDAR sensor that is monitoring all objects on the right hand side of the AV 1304. Thus, the temperature sensor would be weighted lower, i.e., less <1, such as 0.5, and the proximity sensor would be weighted higher, i.e., less >1, such as 1.5.

At 1420, the autonomous vehicle determines whether the number of sensors in the first subset of sensors is less than the second threshold. Thus, continuing the example for the right hand side sensors of having ten sensors and a second threshold is determined or set at three sensors, the AV 1304 determines if the number of failed sensors, or sensors determined to have level of confidence below the confidence level threshold, is less than three. If it is determined that the number of sensors in the first subset of sensors is less than the second threshold, then the process 1400 proceeds to step 1425, if, however, it is determined that the number of sensors in the first subset of sensors is not less than the second threshold then the process 1400 proceeds to step 1430.

At 1425, in response to determining that the number of sensors in the first subset of sensors is less than the second threshold, the autonomous vehicle adjusts the driving capability of the vehicle to rely on information received from a remainder of the plurality of sensors excluding the first subset of the sensors. For example, for the right hand side subset of sensors, if only two sensors have failed, less than the second threshold of five, the AV 1304 adjusts the driving capability of the vehicle to rely on information received from a remainder of the plurality of sensors excluding the first subset of the sensors that failed or is determined to have a level of confidence that is less than a confidence level threshold. In an embodiment, the sensor controller 1328 can increase the coverage of some of the remaining eight sensors by increasing the sampling rate of acquiring new measurements, expand a distance of the measuring area (if applicable), and the like.

At 1430, in response to determining that the number of sensors in the first subset of sensors is not less than the second threshold, the autonomous vehicle adjusts the driving capability of the vehicle to execute emergency maneuvers to navigate the vehicle to a safe location.

In an embodiment, upon determining that the number of sensors in the first subset is greater than or equal to the second threshold (e.g., too many sensors do not meet their corresponding confidence level), the AV 1304 can adjust the driving capability of the vehicle to execute emergency maneuvers (e.g., a safe stop maneuver) to navigate the vehicle to a safe location. For example, if most or all sensors fail, the AV 1304 executes emergency maneuvers to guide itself to safety. For example, the planning module 1338 can update the vehicle operation profile 1384 based on the sensor data 1380, and the AV 1304 can navigate, using a control module (e.g., 1336 in FIG. 13), the AV 1304 using the updated vehicle operation profile 1384.

In an embodiment, the safe location is a location the AV 1304 can perform a safe stop maneuver. For example, a safe location can be a road shoulder, an emergency lane, a service station, a home base for the vehicle, or the like. In an embodiment, a preferred safe location is a home base for the vehicle, however, with dead reckoning localization and the last known data, it may be determined by the AV 1304 that is unlikely the AV 1304 can safely travel back to the home base station, thus other safe locations such as a road shoulder, an emergency lane, or a service station can be used as suitable locations for a safe stop maneuver.

In an embodiment, adjusting the driving capability of the vehicle to navigate the vehicle to a safe location includes avoiding blind spots (e.g., smaller areas of coverage that some or all of the sensors are occluded from detecting). If the AV 1304 is programmed to avoid all blind spots when driving, the safe location in this example is adjusting the driving capability of the AV 1304 to moving the AV 1304 in a safe location where there are no blind spots.

In an embodiment, the second threshold corresponds to all sensors of the plurality of sensors and not just a subset of sensors, and adjusting the driving capability of the vehicle to execute emergency maneuvers includes one or more of activating one or more lights or moving away from a traveled route by dead reckoning. For example, if most or all sensors fail, the AV 1304 executes a safe stop maneuver, including activating hazard lights and moving over to the side of the road by dead reckoning. Dead reckoning refers to navigating the AV 1304 based on the last known accurate set of parameters by using a limited secondary navigation system. For example, a process of dead reckoning can include calculating a current position of the AV 1304 by using a previously determined position, or fixed position, and advancing to that position based upon known or estimated speeds over an elapsed time and course.

Alternatively, or additionally, the autonomous vehicle can enter a "limp home" mode by adjusting the driving capability of the vehicle to execute emergency maneuvers that include accessing last known data for controlling the driving capability of the vehicle, and using the last known data to navigate the vehicle to a safe location. In an embodiment, the last known data includes data received from each sensor before the received information of each sensor indicated that the level of confidence was less than the first threshold, thus the last known data includes only data of each sensor that exceeds the first threshold for the level of confidence. For example, if the received information for a sensor indicates a level of confidence is below a confidence level threshold at a particular time (i.e., 3:00:00 pm), the AV 1304 can utilize the last received data for that particular sensor before that particular time to navigate the AV 1304 to a safe location (i.e., 2:58:00 pm).

In an embodiment, the safe location is a service station. Alternatively, the safe location is a home base for the autonomous vehicle. For example, if most or all sensors fail, the AV 1304 enters a limp home mode, in which the AV 1304 accesses the last known good data from data storage 1364 to guide itself to a nearest service station, or to home, whichever is closer.

In an embodiment, the second threshold corresponds to all sensors of the plurality of sensors and not just a subset of sensors, and adjusting the driving capability of the vehicle to execute emergency maneuvers includes querying one or more other vehicles for driving information, in response to the querying, receiving, from at least one of the one or more other vehicles, information on or more of road conditions or navigation instructions, and using the received information on or more of road conditions or navigation instructions, navigating the vehicle to a safe location. In an embodiment, the safe location is a service station. Alternatively, the safe location is a home base for the autonomous vehicle.

In an embodiment, upon determining that the level of confidence of the received information from at least one sensor of the first subset of sensors is less than the first threshold (i.e., the confidence level threshold), activating one or more backup sensors, and configure the one or more backup sensors to perform operations previously performed by the subset of sensors that have failed. For example, if some sensors fail, the AV 1304 activates, via the sensor controller 1328, backup sensors to take over the tasks of the failed sensors. In an embodiment, the backup sensors are different from sensors included in the plurality of sensors. Alternatively, the backup sensors include at least one sensor of the plurality of sensors. For example, the backup sensors may include a sensor that was originally assigned with monitoring the right hand side of the AV 1304, but is reassigned, by the sensor controller 1328, to monitor either an additional area along with the right hand side, or be reassigned entirely to monitor the different area and to no longer be monitoring the right hand side. Alternatively, the backup sensors include a combination of newly activated sensors, and reassigned sensors that were already activated.

In an embodiment, upon determining that the number of sensors in the subset is less than the second threshold, the autonomous vehicle reconfigures one or more of the remainder of the plurality of sensors to adjust their respective coverage areas, where the adjusted coverage areas overlap at least partially with coverage areas of the subset of sensors that have failed. For example, if some sensors 1310 fail, the AV 1304, via the sensor controller 1328, changes a viewing angle of one or more the remaining sensors to increase the coverage area of those respective sensors. For example, a LiDAR sensor has as 180 degree field of view, but has a third of its field of view occluded, the sensor controller 1328 can adjust the sensor to only acquire the remaining 120 degrees that is not occluded in the data collection process.

In an embodiment, upon determining that the number of sensors in the first subset is greater than or equal to the second threshold, the autonomous vehicle provides a warning to other vehicles indicative of an emergency corresponding to the vehicle. The warning can include one or more of activating a light emitting device of the vehicle, activating a sound emitting device of the vehicle, or the like. For example, the AV 1304 can activate hazard lights and/or honk the horn to alert neighboring cars of an emergency situation. In an embodiment, the warning includes sending a wireless signal to at least one of emergency services and a command center for teleoperation.

Figure 15:
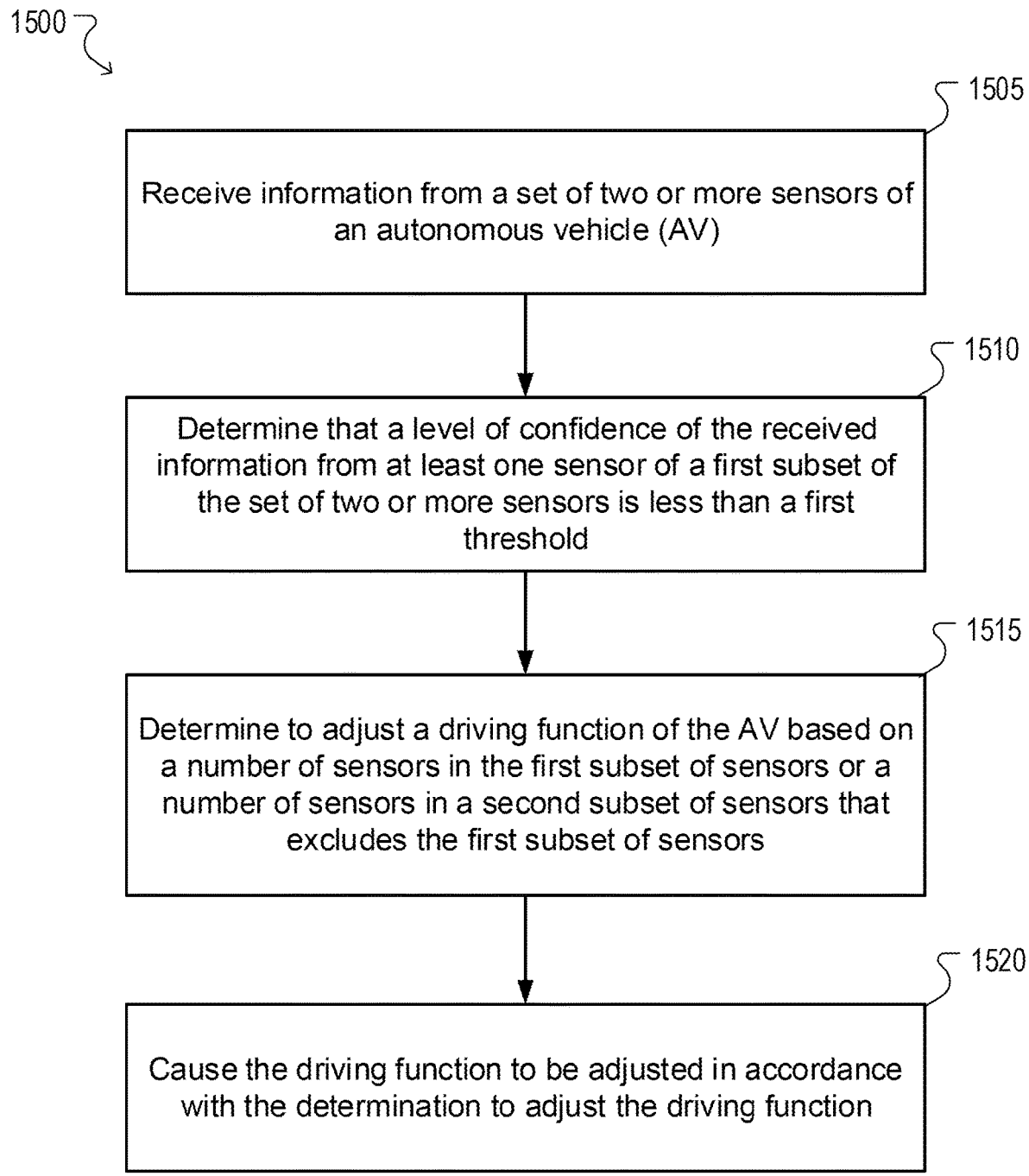
FIG. 15 illustrates a process for implementing an autonomous vehicle response to sensor failure.

FIG. 15 illustrates a process 1500 for implementing an autonomous vehicle response to sensor failure during the operation of an autonomous vehicle, such as AV 1304 of FIG. 13, in accordance with one or more embodiments. In an embodiment, the process 1500 of FIG. 15 is performed by one or more components (e.g., the sensor controller 1328 and/or the planning module 1338 in FIG. 13) of the AV 1304. Other entities (e.g., a remote server 1312 in FIG. 13) perform some or all of the steps of the process 1500 in other embodiments. Likewise, embodiments may include different and/or additional steps, or perform the steps in different orders.

At 1505, the autonomous vehicle receives information from a plurality of sensors coupled to the vehicle. Various examples of sensors include LiDAR, RADAR, camera, RF, ultrasound, infrared, and ultraviolet, such as sensors 121-123 in FIG. 1, discussed herein. Other types of sensors are possible. The information from the sensors includes various measured parameters from the autonomous vehicle's environment. For example, the information from the sensors 1310a-1310n is received by the sensor controller 1328, which is then sent to the AV's 1304 planning module 1338.

At 1510, the autonomous vehicle determines, based on the received information, that a subset of the set of two or more sensors has failed or is determined to have a level of confidence that is less than a confidence level threshold. If the autonomous vehicle determines that a subset of sensors of the set of sensors did not fail, then the autonomous vehicle continues to receive information from the plurality of sensors and monitor for any sensor failures at step 1505. For example, after receiving the sensor information from the sensors 1310a-1310n by the sensor controller 1328, the sensor controller 1328 determines whether a subset of sensors has failed or is determined to have a level of confidence that is less than a confidence level threshold.

In an embodiment, a subset of sensors is determined to have failed or is determined to have a level of confidence that is less than a confidence level threshold by the sensor controller 1328 when measurements are not received from a sensor 1310 within a predetermined time period, e.g., five seconds. The predetermined time period for not receiving a signal to be thus determined as failed, or is determined to have a level of confidence that is less than a confidence level threshold, can range for each sensor from one second to thirty seconds, or even longer. Additionally, or alternatively, the range for each sensor can depend on the type of senor, manufacturer settings, and other similar attributes for each sensor. For example, temperature sensors may be set to take measurements every thirty seconds, thus the predetermined time period for not receiving a signal to be thus determined as failed may be set at one minute. In contrast, sensors such as wheel speed sensors for measuring or estimating wheel slip ratios, wheel brake pressure sensors, or braking torque sensors may be taking measurements constantly, e.g., in millisecond intervals. For those types of sensors, the predetermined time period for not receiving a signal, and thus determined to have failed, will be relatively small, e.g., five seconds.

In an embodiment, the predetermined time period can be set by the sensor controller 1328, such as with an initial sensor profile for each sensor. The sensor profile can be stored in the data storage 1364, or other memory storage in the AV 1304 that the sensor controller 1328 can access. In an embodiment, the predetermined time period can be a time limit as determined by the sensor profile as received via data 1360 from the server 1312, as discussed herein.

In an embodiment, determining that a first subset of sensors has failed, or is determined to have a level of confidence that is less than a confidence level threshold, includes comparing measurements received from sensors in the subset of sensors to a range of values corresponding to a statistical confidence interval (e.g., a range of values within which the sensor measurements are accepted as accurate), and determining that the measurements received from the sensors in the subset of sensors are outside the range of values corresponding to the statistical confidence interval. Examples of determining that the measurements received from the sensors in the first subset of sensors are outside the range of values corresponding to the statistical confidence interval are provided above in process 1400.

In an embodiment, determining that a first subset of sensors has failed, or is determined to have a level of confidence that is less than a confidence level threshold, includes comparing measurements received from sensors in the first subset of the set of two or more sensors to a measurement threshold, and determining whether the measurements received from the sensors in the first subset of sensors are less than or equal to the measurement threshold. The AV 1304 can use a value to determine sensor failure by comparing a degree of loss in perception with a known threshold value. Examples of using a threshold value to determine sensor failure by comparing a degree of loss in perception with a known threshold value are provided above in process 1400.

In an embodiment, a first subset of sensors is determined to have failed, or is determined to have a level of confidence that is less than a confidence level threshold, when measurements received from a particular sensor are consistently different from what is expected. For example, for a particular sensor, there is a range of values that would be expected during normal travel of the AV 1304, such as speed, temperature, etc. If, for example, a particular sensor was measuring a level that was not within that expected range of values, the sensor controller 1328 may determine that the particular sensor has failed, or is determined to have a level of confidence that is less than a confidence level threshold. Additionally, or alternatively, a subset of sensors is determined to have failed, or is determined to have a level of confidence that is less than a confidence level threshold, when measurements received from a particular sensor is consistently different from what is measured by other, similar sensors. For example, for a particular subset of sensors that are measuring a similar attribute, such as speed, if one sensor was measuring the speed of the AV 1304 at 80 km/h, but other sensors were consistently measuring a speed that deviated from that particular sensor, such as 60 km/h, then the sensor controller 1328 may determine that the particular sensor has failed, or at least is determined to have a level of confidence that is less than a confidence level threshold.

At 1515, the autonomous vehicle determines to adjust a driving function of the AV based on a number of sensors in the subset of sensors or a number of sensors in a second subset of sensors that excludes the first subset of sensors. For example, if the sensor controller 1328 of the AV 1304 determines that a particular subset of sensors has failed, or is determined to have a level of confidence that is less than a confidence level threshold, e.g., a subset of sensors that monitor a left hand side of the AV 1304 have failed or are failing based on the level of confidence determined from the sensor data 1311a-1311n, the sensor controller 1328 sends the compiled sensor data 1380 to the planning module 1338 to then determine whether to adjust a driving function of the AV 1304 based on the received sensor data 1380.

At 1520, the autonomous vehicle causes the driving function to be adjusted in accordance with the determination to adjust the driving function. For example, the planning module 1338 can update the vehicle operation profile 1384 based on the sensor data 1380, and the AV 1304 can navigate, using a control module (e.g., the control module 1336 shown in FIG. 13), the AV 1304 using the updated vehicle operation profile 1384.

In an embodiment, process 1500 includes adjusting the driving function of the vehicle to execute emergency maneuvers (e.g., a safe stop maneuver) to navigate the vehicle to a safe location upon determining that the number of sensors in the subset is greater than or equal to a second threshold. For example, if most or all sensors fail or the level of confidence of each sensor is less than the confidence level threshold, the AV 1304 executes emergency maneuvers to guide itself to safety. For example, the planning module 1338 can update the vehicle operation profile 1384 based on the sensor data 1380, and the AV 1304 can navigate, using a control module (e.g., 1336 in FIG. 13), the AV 1304 using the updated vehicle operation profile 1384.

In an embodiment, process 1500 includes adjusting the driving function of the vehicle to execute emergency maneuvers includes one or more of activating one or more lights or moving away from a traveled route by dead reckoning. For example, if most or all sensors fail or the level of confidence is less than the confidence level threshold of each particular sensor, the AV 1304 executes a safe stop maneuver, including activating hazard lights and moving over to the side of the road by dead reckoning. Alternatively, or additionally, the autonomous vehicle can enter a "limp home" mode by adjusting the driving capability of the vehicle to execute emergency maneuvers that include accessing last known data for controlling the driving capability of the vehicle, and using the last known data to navigate the vehicle to a safe location. In an embodiment, the safe location is a service station. Alternatively, the safe location is a home base for the autonomous vehicle. For example, if most or all sensors fail or the level of confidence is less than the confidence level threshold of each particular sensor, the AV 1304 enters a limp home mode, in which the AV 1304 accesses the last known good data from data storage 1364 to guide itself to a nearest service station, or to home, whichever is closer.

In an embodiment, process 1500 includes adjusting the driving function of the vehicle to execute emergency maneuvers which includes querying one or more other vehicles for driving information, and in response to the querying, receiving, from at least one of the one or more other vehicles, information on or more of road conditions or navigation instructions, and using the received information on or more of road conditions or navigation instructions, navigating the vehicle to a safe location. In an embodiment, the safe location is a service station. Alternatively, the safe location is a home base for the autonomous vehicle.

In an embodiment, upon determining that a subset of two or more sensors has failed, or is determined to have a level of confidence that is less than a confidence level threshold, the autonomous vehicle can activate one or more backup sensors, and configure the one or more backup sensors to perform operations previously performed by the subset of sensors that have failed, or is determined to have a level of confidence that is less than a confidence level threshold. For example, if some sensors fail, the AV 1304 can activate, via the sensor controller 1328, backup sensors to take over the tasks of the failed sensors. In an embodiment, the backup sensors are different from sensors included in the plurality of sensors. Alternatively, the backup sensors include at least one sensor of the plurality of sensors. For example, the backup sensors may include a sensor that was originally assigned with monitoring the right hand side of the AV 1304, but is reassigned, by the sensor controller 1328, to monitor either an additional area along with the right hand side, or be reassigned entirely to monitor the different area and to no longer be monitoring the right had side. Alternatively, the backup sensors include a combination of newly activated sensors, and reassigned sensors that were already activated.

In an embodiment, upon determining that a first subset of two or more sensors is determined to have a level of confidence that is less than a confidence level threshold or has failed, the autonomous vehicle can reconfigure one or more of the remainder of the plurality of sensors to adjust their respective coverage areas, where the adjusted coverage areas overlap at least partially with coverage areas of the subset of sensors that have failed or the level of confidence is less than the confidence level threshold of each particular sensor. For example, if some sensors 1310 fail or the level of confidence is less than the confidence level threshold of each particular sensor, the AV 1304, via the sensor controller 1328, can change a viewing angle of one or more the remaining sensors to increase the coverage area of those respective sensors.

In an embodiment, upon determining that the number of sensors in the first subset of two or more sensors is determined to have a level of confidence that is less than a confidence level threshold or have failed is greater than or equal to a second threshold (e.g., too many sensors are failing or have failed to safely continue driving the AV 1304), the autonomous vehicle can provide a warning to other vehicles indicative of an emergency corresponding to the vehicle. The warning can include one or more of activating a light emitting device of the vehicle, activating a sound emitting device of the vehicle, or the like. For example, the AV 1304 can activate hazard lights and/or honk the horn to alert neighboring cars of an emergency situation.

In the foregoing description, embodiments of the invention have been described with reference to numerous specific details that may vary from embodiment to embodiment. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
    receiving information from a set of two or more sensors of an autonomous vehicle (AV);
    determining that a level of confidence of the received information from at least one sensor of a first subset of the set of two or more sensors is less than a first threshold;
    in response to determining that the level of confidence of the received information from the at least one sensor of the first subset of sensors is less than the first threshold, determining whether to adjust a driving function of the AV based on a number of sensors in the first subset of sensors or a number of sensors in a second subset of sensors that excludes the first subset of sensors;
    in accordance with the determination to adjust the driving function, causing the driving function to be adjusted by accessing last known data for controlling the driving function of the AV, wherein the last known data includes information received from a particular sensor before the received information of the particular sensor indicated that the level of confidence was less than the first threshold; and
    using the last known data, navigating the AV to a safe location.

2. The method of claim 1, wherein the level of confidence of the received information for each sensor of the first subset of sensors exceeds the first threshold.

3. The method of claim 1, wherein each sensor is allocated a weight indicative of a corresponding importance of each respective sensor, and wherein determining whether to adjust the driving function of the AV based on the number of sensors in the first subset of sensors or the number of sensors in a second subset of sensors that excludes the first subset of sensors comprises:
    weighting each sensor in the first subset of sensors according to a respective weight; and
    comparing a weighted number of the sensors in the first subset of the set of two or more sensors to a second threshold.

4. The method of claim 1, wherein causing the driving function to be adjusted comprises:
    adjusting the driving function of the AV to execute emergency maneuvers to navigate the AV to the safe location.

5. The method of claim 4, wherein adjusting the driving function of the AV to execute emergency maneuvers comprises one or more of activating one or more lights or moving away from a traveled route by dead reckoning.

6. The method of claim 4, wherein adjusting the driving function of the AV to execute emergency maneuvers comprises:
    querying one or more other vehicles for driving information;
    in response to the querying, receiving, from at least one of the one or more other vehicles, information on or more of road conditions or navigation instructions; and
    using the received information on or more of road conditions or navigation instructions, navigating the AV to the safe location.

7. The method of claim 1, wherein the safe location is one of a road shoulder, an emergency lane, a service station, or a home base for the AV.

8. The method of claim 1, further comprising:
upon determining that the level of confidence of the received information from at least one sensor of the first subset of the set of two or more sensors is less than the first threshold, activating one or more backup sensors; and
configuring the one or more backup sensors to perform operations previously performed by the first subset of sensors.

9. The method of claim 8, wherein the one or more backup sensors are different from sensors included in the set of two or more of sensors.

10. The method of claim 8, wherein one or more backup sensors include at least one sensor of the set of two or more sensors.

11. The method of claim 1, further comprising:
upon determining that the number of sensors in the first subset of the set of two or more sensors is greater than or equal to a second threshold, providing a warning to other vehicles indicative of an emergency corresponding to the AV.

12. The method of claim 11, wherein the warning includes one or more of activating a light emitting device of the AV, or activating a sound emitting device of the AV.

13. The method of claim 11, wherein the warning includes sending a wireless signal to at least one of emergency services and a command center for teleoperation.

14. The method of claim 1, wherein determining that the level of confidence of the received information from at least one sensor of the first subset of the set of two or more sensors is less than the first threshold comprises:
comparing measurements received from sensors in the first subset of the set of two or more sensors to a measurement threshold; and
determining whether the measurements received from the sensors in the first subset of the set of two or more sensors are less than or equal to the measurement threshold.

15. The method of claim 14, wherein comparing measurements received from sensors in the first subset of the set of two or more sensors to the measurement threshold comprises:
for each respective sensor in the first subset of the set of two or more sensors that the level of confidence of the received information is less than the first threshold,
determining a sensor type and a coverage area of the respective sensor;
identifying a third subset of other sensors of at least one of the same sensor type of the respective sensor or of the same coverage area, wherein each identified sensor in the third subset of other sensors does not have a level of confidence of the received information less than the first threshold;
acquiring measurements received from the third subset of other sensors; and
determining whether measurements received from each sensor in the third subset of other sensors compared to measurements received from the respective sensor in the first subset of sensors are greater than or equal to a sensor agreement threshold.

16. The method of claim 15, further comprising:
upon determining that measurements received from each sensor in the third subset of other sensors compared to measurements received from each respective sensor in the first subset of the set of two or more sensors are greater than or equal to the sensor agreement threshold, determining that the measurements received from the respective sensor in the first subset of sensors are less than or equal to the measurement threshold.

17. The method of claim 1, wherein determining that a level of confidence of the received information from at least one sensor of a first subset of the set of two or more sensors is less than a first threshold comprises:
comparing measurements received from sensors in the first subset of the set of two or more sensors to a range of values corresponding to a statistical confidence interval; and
determining that the measurements received from the sensors in the first subset of the set of two or more sensors are outside the range of values corresponding to the statistical confidence interval.

18. A vehicle comprising:
a set of two or more sensors;
one or more processors;
memory storing instructions that when executed by the one or more processors, cause the one or more processors to perform operations comprising:
receiving information from the set of two or more sensors;
determining, based on the received information, that a level of confidence of the received information from at least one sensor of a first subset of the set of two or more sensors is less than a first threshold;
in response to determining that the level of confidence of the received information from the at least one sensor of the first subset of sensors is less than the first threshold,
determining whether to adjust a driving function of the vehicle based on a number of sensors in the first subset of sensors or a number of sensors in a second subset of sensors that excludes the first subset of sensors; and
in accordance with the determination to adjust the driving function, causing the driving function to be adjusted by accessing last known data for controlling the driving function of the vehicle, wherein the last known data includes information received from a particular sensor before the received information of the particular sensor indicated that the level of confidence was less than the first threshold; and
using the last known data, navigating the vehicle to a safe location.

* * * * *

UNITED STATES PATENT AND TRADEMARK OFFICE
CERTIFICATE OF CORRECTION

| | | |
|---|---|---|
| PATENT NO. | : 12,179,794 B2 | Page 1 of 1 |
| APPLICATION NO. | : 18/092960 | |
| DATED | : December 31, 2024 | |
| INVENTOR(S) | : Zachary Thomas Batts et al. | |

It is certified that error appears in the above-identified patent and that said Letters Patent is hereby corrected as shown below:

In the Claims

In Claim 10, Column 37, Line 13, delete "one or more the" and insert -- the one or more --.

Signed and Sealed this
Eighth Day of July, 2025

Coke Morgan Stewart
*Acting Director of the United States Patent and Trademark Office*